(12) United States Patent
Koski

(10) Patent No.: US 6,420,456 B1
(45) Date of Patent: *Jul. 16, 2002

(54) PROCESS FOR HYDROPHOBICIZING PARTICLES, AND THEIR USE AS FILLERS IN POLYMER MASTERBATCHES

(75) Inventor: Ahti Koski, Wilkesport (CA)

(73) Assignee: Bayer Inc., Sarnia (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,378

(22) Filed: May 21, 1998

(51) Int. Cl.$^7$ .......................... C08K 3/36; C08K 5/544; C08K 9/06
(52) U.S. Cl. .................. 523/213; 523/209; 523/216; 523/351; 524/188; 524/262; 524/425; 524/431; 524/445; 106/490; 428/405
(58) Field of Search ................. 524/492, 262, 524/445, 425, 431, 188, 493; 106/490, 475, 446, 465; 523/213, 209, 216, 351; 428/405

(56) References Cited

U.S. PATENT DOCUMENTS

| | | | | |
|---|---|---|---|---|
| RE30,699 E | * | 8/1981 | Iannicelli | 524/262 |
| 5,332,767 A | * | 7/1994 | Reisser et al. | 524/262 |
| 5,695,851 A | * | 12/1997 | Watanabe et al. | 428/405 |

FOREIGN PATENT DOCUMENTS

| | | | | |
|---|---|---|---|---|
| JP | 1033560 A | * | 2/1989 | 523/213 |

* cited by examiner

Primary Examiner—Peter Szekely
(74) Attorney, Agent, or Firm—Joseph C. Gil; Noland J. Cheung

(57) ABSTRACT

Particles are hydrophobicized by treatment with a compound containing amino and silane groups, followed by treatment with a silane compound containing a hydrophobic group. The invention is particularly useful for treating hydrophilic mineral particles. The treated particles can be used, for example, as fillers in polymer masterbatches.

39 Claims, 5 Drawing Sheets

PROCESS FOR HYDROPHOBICIZING PARTICLES, AND THEIR USE AS FILLERS IN POLYMER MASTERBATCHES

BACKGROUND OF THE INVENTION

1. Field of the Invention

In one of its aspects, the present invention relates to the hydrophobicizing of particles, particularly mineral particles that are hydrophilic and have surface hydroxyl groups, for example silica, silicates, clay, alumina, titanium dioxide and the like. The invention also extends, however, to treatment of non-mineral particles, for instance carbon black. In another of its aspects, the present invention also relates to the treated partices, per se. The treated particles are useful particularly, but not exclusively, as a filler in polymers, especially rubber. In another of its aspects, the present invention, also relates to a filled, particularly silica-filled, rubber masterbatch, and to a process for preparing it.

2. Description of the Prior Art

In recent years, there has developed a considerable interest in silica reinforced tires, particularly since the appearance in 1992 of the Groupe Michelin (G-M) patents (EP 05 01 227 A 1; AU-A-111 77 192) indicating that tires made with tread formulations incorporating silica enjoy some important performance advantages over those based on conventional carbon black filler. Improvements are claimed for this "Green Tire" in the areas of (a) lower rolling resistance, (b) better traction on snow, and (c) lower noise generation, when compared with conventional tires filled with carbon black.

Rubber for tires is often supplied by a rubber producer to a tire manufacturer in the form of a masterbatch containing an elastomer, which is typically a hydrocarbon rubber, an oil extender and a filler. The conventional filler has been carbon black in the form of fine particles. These particles have hydrophobic surface characteristics and will therefore disperse relatively easily within the hydrophobic elastomer. In contrast, conventional silica has a relatively hydrophilic surface, and considerable difficulty has been encountered in dispersing conventional silica in the hydrophobic rubber elastomer.

In the past, efforts have been made to make masterbatches from elastomer dispersions and aqueous dispersions of silica pigment, such as those referred to and attempted by Burke, in U.S. Pat. No. 3,700,690. Burke attempted to overcome the previously known difficulties of incorporating fine particles of silica uniformly into a masterbatch. At the time of the Burke invention, there was no known elastomer-silica masterbatch offered in the commercial market. Similarly today, to the Applicant's knowledge, there are no commercially available in situ produced elastomer-silica masterbatches in the market, despite the efforts of Burke (i.e., conventional elastomer-silica masterbatches are produced and available in the dry state).

SUMMARY OF THE INVENTION

It is an object of the present invention to obviate or mitigate at least one of the above-mentioned disadvantages of the prior art.

It is another object of the present invention to provide a novel, relatively hydrophobic particulate material.

It is yet another object of the present invention to provide a novel process for treating particulate material to render it relatively hydrophobic.

It is yet another object of the present invention to provide a novel masterbatch composition comprising an elastomer and a relatively hydrophobic particulate material.

It is yet another object of the present invention to provide a novel process for producing a masterbatch composition comprising an elastomer and a relatively hydrophobic particulate material.

Accordingly, in one of its aspects, the present invention provides a process for treating particles, particularly mineral particles, to render them hydrophobic, the process comprising the steps of:

(a) contacting the particles with a compound of Formula I:

or an acid addition or quaternary ammonium salt thereof, in which:

at least one of $R^1$, $R^2$ and $R^3$, preferably two of $R^1$, $R^2$ and $R^3$ and most preferably $R^1$, $R^2$ and $R^3$ are hydroxyl or hydrolysable groups;

$R^4$ is a divalent group that is resistant to hydrolysis at the Si—$R^4$ bond;

$R^5$ is selected from the group comprising: hydrogen; $C_{1\text{-}40}$ alkyl; a $C_{2\text{-}40}$ mono-, di- or tri-unsaturated alkenyl group; a $C_6$–$C_{40}$ aryl group; a group of the formula:

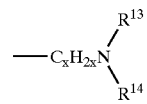

in which x is an integer from 2 to 10, $R^{13}$ and $R^{14}$, which may be the same or different, are each hydrogen; $C_{1\text{-}18}$ alkyl; $C_{2\text{-}18}$ mono-, di- or tri-unsaturated alkenyl; phenyl; a group of formula:

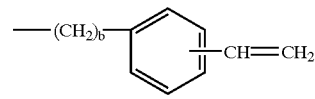

wherein b is an integer from 1 to 10; a group of formula:

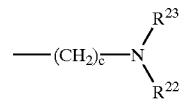

wherein c is an integer from 1 to 10 and $R^{22}$ and $R^{23}$ which may be the same or different, are each hydrogen, $C_{1\text{-}10}$ alkyl group or $C_{2\text{-}10}$ alkenyl group, provided that there is no double bond in the position alpha to the nitrogen atom; a group of formula:

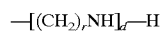

wherein r is an integer from 1 to 6 and d is an integer from 1 to 4;

$R^6$ may be any of the groups defined for $R^5$, or $R^5$ and $R^6$ may together form a divalent group of formula:

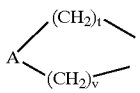

in which A is selected from the group comprising —CHR or —NR group in which R is hydrogen or a $C_{1-40}$ alkyl or $C_{2-40}$ alkenyl group, a $C_6$–$C_{40}$ aryl group, an oxygen atom and a sulfur atom, and t and v are each independently 1, 2, 3 or 4; provided that the sum of t and v does not exceed 6, and is preferably 4; and (b) contacting the particles with a compound of the Formula II:

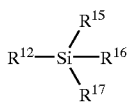

(II)

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups, preferably phenyl groups; a group of formula:

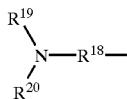

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, for example the phenylene group —($C_6H_4$)—, the biphenylene group —($C_6H_4$)—($C_6H_4$)—, the —($C_6H_4$)—O—($C_6H_4$)— group or the naphthylene group, —($C_{10}H_6$)—, the aromatic group being unsubstitued or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

Preferably, $R^{18}$ is a $C_1$–$C_{40}$ saturated or unsaturated group (e.g., alkenyl, aryl, cycloalkyl and the like).

In the present process, Steps (a) and (b) may be conducted concurrently or sequentially. If Steps (a) and (b) are conducted sequentially, it is preferred to conduct Step (a) followed by Step (b).

As will be apparent to those of skill in the art, there are instances where Formulae I and II may be the same compound—e.g., when $R^5=R^{19}$=a $C_{8-40}$ alkyl group or $R^5=R^{19}$=a $C_{8-40}$ mono-, di- or tri-unsaturated alkenyl group. Thus, in such cases where Formulae I and II are the same compound, it will be clearly understood that the present process intentionally embodies a single step process (i.e., where the compound of Formulae I and II is added in a single step) and a multi-step process (i.e., where the compound of Formulae I and II is added proportionally in two or more steps).

In another of its aspects, the present invention provides a treated particulate material comprising particles having bound thereto an aminohydrocarbonsiloxane (e.g., an amino (alkyl)siloxane) moiety—i.e., a hydrocarbon moiety comprising both silicon and nitrogen.

Preferably, the aminohydrocarbonsilane moiety has the formula

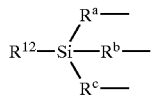

in which:

$R^a$, $R^b$ and $R^c$ are the same or different and each is selected from —O— and —$C_pH_{2p}$—, optionally substituted by one or more oxygen atoms and wherein p is an integer of from 1 to 10; and $R^{12}$ is a $C_{8-40}$ alkyl group; a $C_{8-40}$ mono-, di- or tri-unsaturated alkenyl group; a group of formula

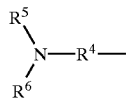

or an acid addition or quaternary ammonium salt thereof in which $R^4$ is a divalent group resistant to hydrolysis at the Si—$R^4$ bond, $R^5$ is hydrogen, $C_{1-40}$ alkyl, $C_{2-40}$ mono-, di- or tri-unsaturated alkenyl; a group of formula

—$ArC_wH_{2w+1}$ in which Ar represents a divalent aromatic group and w is an integer from 1 to 20, and $R^6$ may be any of the groups defined for $R^5$, with the proviso that at least one of $R^5$ and $R^6$ must have an uninterrupted carbon chain at least 8 carbon atoms in length.

In yet another of its aspects, the present invention provides a particulate material comprising particles having: (i) bound thereto an aminohydrocarbonsiloxane (e.g., an amino (alkyl)siloxane) moiety (i.e., a hydrocarbon moiety comprising both silicon and nitrogen), and (ii) a contact angle of at least about 100°. Preferably, the aminohydrocarbonsilane moiety has the formula set out hereinabove. Preferably, the particles have a contact angle of at least about 110°, more preferably in the range of from about 115° to about 160°, even more preferably in the range of from about 120° to about 150°, most preferably in the range of from about 120° to about 140°. In contrast, the contact angle of silica particles which are not treated in accordance with the present process is typically 75°.

The contact angle of the particles with water may be readily determined according to the following procedure:

(i) double-sided tape is attached to a probe (e.g., a stirrup) and coated with the particulate material by immersing the tape in a sample of the particulate material;

(ii) excess powder is removed by gentle tapping and large powder clusters are removed by careful wiping;

(iii) the probe coated with particulate material is immersed into distilled water using a conventional contact angle analyzer (e.g., a Cahn Dynamic Contact Angle Analyzer) at a rate of 100 microns per second.

This procedure results in determination of the advancing contact angle of the particles.

In yet another of its aspects, the present invention provides a particulate material produced by contacting the particles with a compound of Formula I:

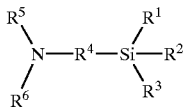

(I)

or an acid addition or quaternary ammonium salt thereof, in which:

at least one of $R^1$, $R^2$ and $R^3$, preferably two of $R^1$, $R^2$ and $R^3$ and most preferably $R^1$, $R^2$ and $R^3$ are hydroxyl or hydrolysable groups;

$R^4$ is a divalent group that is resistant to hydrolysis at the Si—$R^4$ bond;

$R^5$ is selected from the group comprising: hydrogen; a $C_{1-40}$ alkyl; a $C_{2-40}$ mono-, di- or tri-unsaturated alkenyl group; a $C_6$–$C_{40}$ aryl group; a group of the formula:

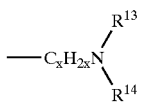

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

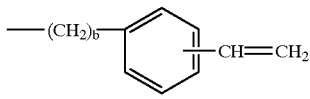

wherein b is an integer from 1 to 10; a group of formula:

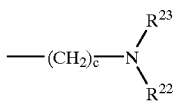

wherein c is an integer from 1 to 10 and $R^{22}$ and $R^{23}$ which may be the same or different, are each hydrogen, $C_{1-10}$ alkyl group or $C_{2-10}$ alkenyl group, provided that there is no double bond in the position alpha to the nitrogen atom; a group of formula:

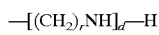

wherein r is an integer from 1 to 6 and d is an integer from 1 to 4;

$R^6$ may be any of the groups defined for $R^5$, or $R^5$ and $R^6$ may together form a divalent group of formula:

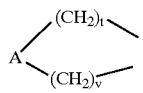

in which A is selected from the group comprising —CHR or —NR group in which R is hydrogen or a $C_{1-40}$ alkyl or $C_{2-40}$ alkenyl group, a $C_6$–$C_{40}$ aryl group, an oxygen atom and a sulfur atom, and t and v are each independently 1, 2, 3 or 4; provided that the sum of t and v does not exceed 6, and is preferably 4;

and a compound of the Formula II:

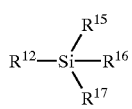

(II)

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups, preferably phenyl groups; a group of formula:

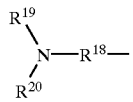

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, for example the phenylene group —($C_6H_4$)—, the biphenylene group —($C_6H_4$)—($C_6H_4$)—, the —($C_6H_4$)—O—($C_6H_4$)— group or the naphthylene group, —($C_{10}H_6$)—, the aromatic group being unsubstitued or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

Preferably, the present process of treating a particulate material is carried out in an aqueous solution, dispersion or slurry, so that the product of the process is an aqueous dispersion or slurry of hydrophobicized mineral particles.

In one preferred embodiment, the dispersion or slurry resulting from the present process, and containing the treated particles (preferably mineral particles such as silica), is then mixed with a hydrocarbon solution of an elastomer, and then dried to form a silica-filled rubber masterbatch. Owing to the hydrophobicized nature of the silica filler, it is well dispersed in the elastomer. This preferred embodiment results in the in situ production of a masterbatch composition comprising the elastomer and the treated particles. By "in situ production" is meant that treated particles are incorporated into a masterbatch composition without being isolated (i.e., separated from the dispersion or slurry, and subsequently dried). This preferred embodiment is believed to be the first in situ production of a masterbatch composition comprising an elastomer and a treated particulate material such as silica.

Alternatively, the treated particulate material may be separated from the dispersion or slurry, and subsequently dried for later use.

BRIEF DESCRIPTION OF THE DRAWINGS

Embodiments of the present invention will be described with reference to e accompanying drawings, in which.

DETAILED DESCRIPTION OF THE PREFERRED EMBODIMENTS

Figure 1:
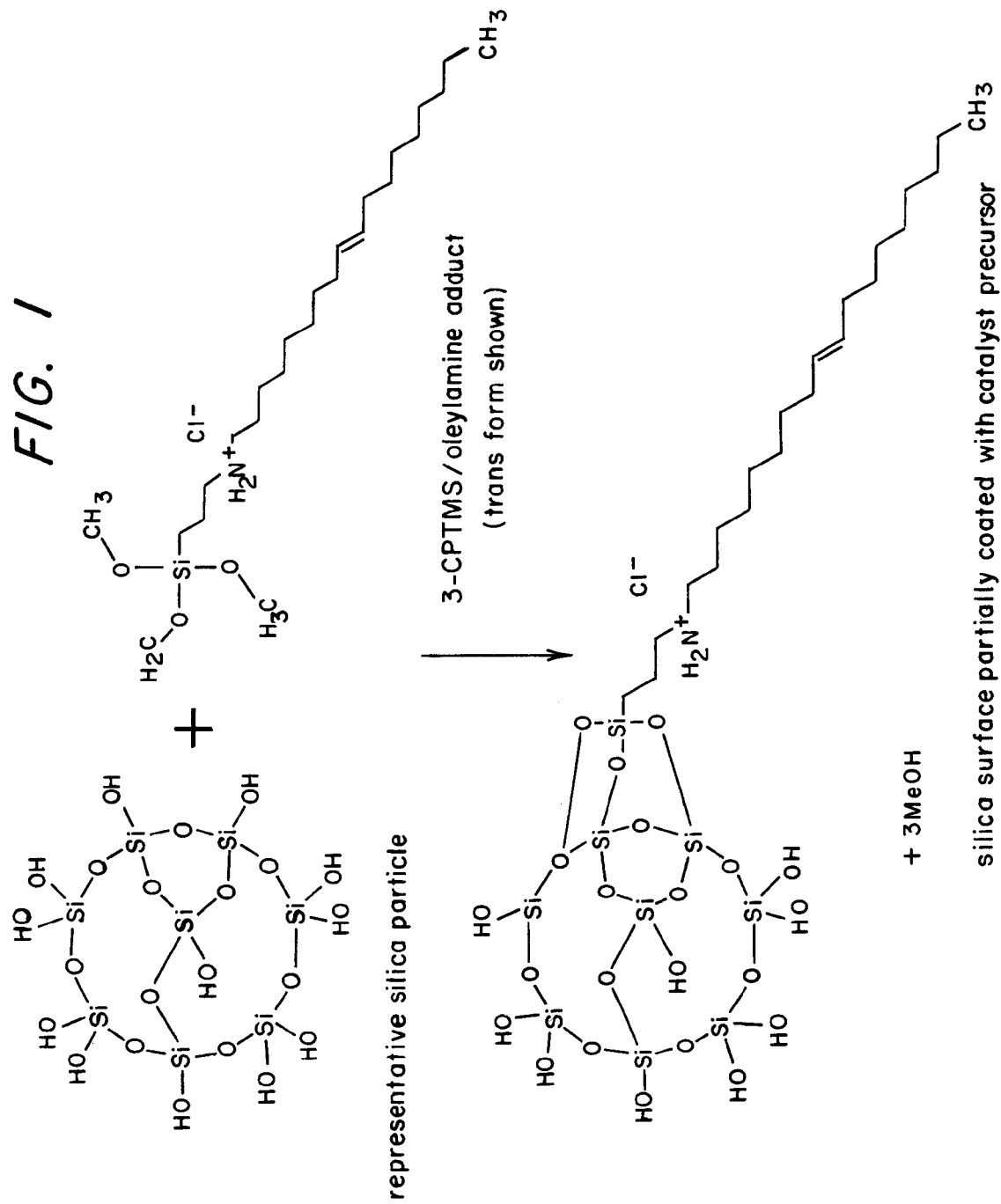
FIGS. 1–4 illustrate a reaction pathway for a specific embodiment of the resent process.

Throughout this specification, the invention is illustrated with reference to silica as the particle having surface hydroxyl groups, but it should be appreciated that the invention applies to the use of other such minerals, and the description understood accordingly. For example, the present process may be applied to a particulate mineral material selected from the group comprising silicates, silicas (particularly silica made by carbon dioxide precipitation of sodium silicate), clay, titanium dioxide, alumina, calcium carbonate, zinc oxide and mixtures thereof. The present process may also be applied to a particulate non-mineral material such as carbon black. Of course, mixtures of particulate materials may be used.

In a preferred embodiment, the treatment is carried out in an aqueous dispersion or slurry and the concentration of the aqueous dispersion or slurry of silica particles may be between 1 and 30 percent by weight of silica in water, preferably between 5 and 25 percent by weight of silica in water and most preferably between 8 and 22 percent by weight of silica in water. Dried amorphous silica suitable for use in accordance with the invention may have a mean agglomerate particle size between 1 and 100 microns, preferably between 10 and 50 microns and most preferably between 10 and 25 microns. . It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/II, of from 0 to 10 percent by weight. If filter cake is used, it may be made by any known means such as described in Ullmann's Encyclopedia of Industrial Chemical Vol A23 pages 642–643, VCH Publishers, ©1993. The filter cake has a preferred solids content of between 5 and 30 percent by weight, most preferably between 15 and 25 percent by weight, and it may be redispersed in water in accordance with the present process to give a silica concentration of between 5 and 20 percent by weight and most preferably between 8 and 12 percent by weight. It is preferred to use a filter cake.

If a never-filtered slurry prepared from the known reaction of a solution of alkali metal silicate with either mineral acid or carbon dioxide is used, it is preferred that the solids content of the never-filtered slurry be between 1 and 30, more preferably between 5 and 10, percent by weight of silica. The slurry temperature may be between 0 and 100 degrees Celsius if the process is conducted at atmospheric pressure or between 0 and 135 degrees Celsius if the operation is conducted in a pressure vessel. Most preferably, the process is conducted at atmospheric pressure in which case the preferred temperature is between 30 and 95 degrees Celsius and most preferably between 45 and 90 degrees Celsius.

It is desirable that, prior to the addition to the silica particles of the compound of Formula I, the dispersion or slurry shall have a pH in the range from 6 to about 8, more preferably from about 6.8 to about 7.2. If necessary, the pH can be adjusted by addition of acid or alkali, for example mineral acid, alkali metal hydroxide, alkaline earth hydroxide, ammonium hydroxide and the like. These can be added as such or in aqueous solution.

In the compound of Formula I, it is preferred that all three of the groups $R^1$, $R^2$ and $R^3$ are readily hydrolysable. Suitable groups $R^1$ include hydroxyl groups and hydrolysable groups of formula $OC_pH_{2p}+1$, where p has a value from 1 to 10. The alkyl chain can be interrupted by oxygen atoms, to give groups, for example, of formula $CH_3OCH_2O—$, $CH_3OCH_2OCH_2O—$, $CH_3(OCH_2)_4O—$, $CH_3OCH_2CH_2O—$, $C_2H_5OCH_2O—$, $C_2H_5OCH_2OCH_2O—$, or $C_2H_5OCH_2CH_2O—$. Other suitable hydrolysable groups include phenoxy, acetoxy, chloro, bromo, iodo, ONa, OLi, OK or amino or mono- or dialkylamino, wherein the alkyl group(s) have 1 to 30 carbon atoms.

$R^2$ and $R^3$ can take the same values as $R^1$, provided that only one of $R^1$, $R^2$ and $R^3$ is chloro, bromo or iodo. Preferably, only one or two of $R^1$, $R^2$ and $R^3$ is hydroxyl or ONa, OLi or OK.

Non-limiting examples of groups $R^2$ and $R^3$ that are not hydrolysable include $C_{1-10}$ alkyl, $C_{2-10}$ mono- or diunsaturated alkenyl, and phenyl. $R^2$ and $R^3$ can also each be a group $—R^4—NR^5R^6$, discussed further below. It is preferred that $R^1$, $R^2$ and $R^3$ are all the same and are $CH_3O—$, $C_2H_5O—$ or $C_3H_8O—$. Most preferably they are all $CH_3O—$.

The divalent group $R^4$ is preferably such that $N—R^4—Si$ is of the formula:

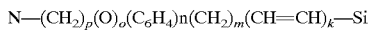

$$N—(CH_2)_p(O)_o(C_6H_4)n(CH_2)_m(CH=CH)_k—Si$$

in which k, m, n, o and p are all whole numbers. The order of the moieties between N and Si is not particularly restricted other than neither N or O should be directly bound to Si. The value of k is 0 or 1, the value of m is from 0 to 20 inclusive, the value of n is 0, 1 or 2, the value of o is 0 or 1 and the value of p is from 0 to 20 inclusive, with the provisos that the sum of the values of k, m, n, o and p is at least 1 and not more than 20 and that if o is 1, p is 1 or greater and the sum of k, m and n is 1 or greater, i.e. that the Si atom is linked directly to a carbon atom. There should be no hydrolysable bond between the silicon and nitrogen atoms. Preferably, m is 3 and I, n, o and p are all 0, i.e., $R^4$ is $—CH_2CH_2CH_2—$.

The group $R^5$ is preferably a $C_{8-20}$ monounsaturated alkenyl group, most preferably a $C_{16-18}$ monounsaturated alkenyl group. $R^6$ is preferably hydrogen.

Suitable compounds of Formula I include, but are not limited to: 3-aminopropylmethyldiethoxysilane, N-2-(vinylbenzylamino)-ethyl-3-aminopropyltrimethoxysilane, N-(2-aminoethyl)-3-aminopropyltrimethoxy-silane, trimethoxysilylpropyldiethylenetriamine, N-2-(aminoethyl)-3-aminopropyltris(2-ethylhexoxy)silane, 3-aminopropyldiisopropylethoxysilane, N-(6-aminohexyl)

aminopropyltrimethoxysilane, 4-aminobutyltriethoxysilane, 4-aminobutyldimethylmethoxysilane, triethoxysilylpropyldiethylenetriamine, 3-aminopropyltris(methoxyethoxyethoxy)silane, N-(2-aminoethyl)-3-aminopropyltrimethoxysilane, N-2-(aminoethyl)-3-aminopropyltris(2-ethylhexoxy)silane, 3-aminopropyldiisopropylethoxysilane, N-(6-aminohexyl)aminopropyltrimethoxysilane, 4-aminobutyltriethoxysilane, and (cyclohexylaminomethyl)-methyldiethoxysilane.

Preferred compounds of Formula I include those in which $R^5$ is hydrogen and $R^6$ is the alkenyl group from the following: soya alkyl, tall oil alkyl, stearyl, tallow alkyl, dihydrogenated tallow alkyl, cocoalkyl, rosin alkyl, and palmityl, it being understood that in this case the alkyl may include unsaturation.

It is preferred that at least one of $R^4$, $R^{13}$ and $R^{14}$ has a chain of at least 8 carbon atoms, more preferably at least 10 carbon atoms, uninterrupted by any heteroatom.

The compound of Formula I can be used as the free base, or in the form of its acid addition or quaternary ammonium salt, i.e.

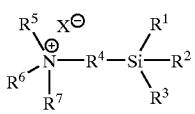

wherein $R^1$, $R^2$, $R^3$, $R^4$, $R^5$ and $R^6$ are as defined above; $R^7$ is selected from the group comprising hydrogen, a $C_{1-40}$ alkyl group or $C_{2-40}$ mono-, di- or tri-unsaturated alkenyl group, and X is an anion. X is suitably chlorine, bromine, or sulphate, of which chlorine and bromine are preferred, and $R^7$ is preferably hydrogen.

Non-limiting examples of suitable salts of compounds of Formula I include N-oleyl-N-[(3-triethoxysilyl)propyl]ammonium chloride, N-3-aminopropylmethyldiethoxysilane hydrobromide, (aminoethylamino-methyl)phenyltrimethoxysilane hydrochloride, N-[(3-trimethoxysilyl)propyl]-N-methyl,N-N-diallylammonium chloride, N-tetradecyl-N,N-dimethyl-N-[(3-trimethoxysilyl)propyl]ammonium bromide, 3[2-N-benzylaminoethylaminopropyl]trimethoxysilane hydrochloride, N-octadecyl-N,N-dimethyl-N-[(3-trimethoxysilyl)propyl]ammonium bromide, N-[(trimethoxysilyl)propyl]-N-tri(n-butyl) ammonium chloride, N-octadecyl-N-[3-triethoxysilyl)propyl] ammonium chloride and N-2-(vinylbenzylamino)ethyl-3-aminopropyl-trimethoxysilane hydrochloride.

It is preferred to use the compound of Formula I in salt form. The most preferred compound is N-oleyl-N-[(3-trimethoxysilyl)propyl]ammonium chloride.

The amount of the compound of Formula I may be between 0.1 and 20 percent by weight of the mineral particles in the slurry (dry basis) and preferably between 0.25 and 10 percent by weight and most preferably between 0.5 and 2 percent by weight. Preferably, the amount of the compound of Formula I used varies inversely with the mineral particle size. The compound may be added to the slurry in its natural state, either as a liquid or a solid. However, to facilitate dispersion, it is preferred where possible to add the compound as a liquid. If the melting point of the compound is below 95 degrees Celsius, it is preferred to add it to the slurry in a molten state at a temperature at least 5 degrees Celsius above the melting point, provided the temperature of the compound in the liquified state does not exceed 100 degrees Celsius and provided that the compound does not decompose under these conditions. If the melting point exceeds 95 degrees Celsius, it is most preferred to use a solvent. Preferred solvents are water and alcohols containing 1 to 5 carbon atoms and most preferably those containing 1 to 3 carbon atoms, that is to say methanol, ethanol, n-propanol or isopropanol. If the compound of Formula I is an alkoxysilane, then most preferably the alkoxy group of the solvent alcohol will be the same as the alkoxy group of the alkoxysilane. For example, if the compound of Formula I is a methoxysilane, the preferred solvent is methanol. The concentration of the compound in the solvent may be from 10 to 90 percent by weight and more preferably between 25 and 75 percent by weight and most preferably 50 percent by weight. Preferably, the solution can be prepared and added to the slurry at a temperature between a lower limit of 0 degrees Celsius and an upper limit which is the lower of at least 10 degrees below the boiling point of the solvent and 95 degrees Celsius. The dispersion of the compound is effected by mixing.

It is preferred that, for the specific compound of Formula I which is added, the equivalent balance (EB) should be calculated. The EB is used to determine whether mineral acid or alkali metal hydroxide, or solution thereof, should be added. The equivalent balance (EB) may be determined from the absolute value of the sum of the group values of X (if present), $R^1$, $R^2$ and $R^3$ and the magnitude of the sum of the group contributions of X (if present), $R^1$, $R^2$ and $R^3$ together with the weight added and the molecular weight of the compound of Formula I, according to the following scheme:

The group contribution of X for either X=Cl or X=Br is −1, thus, if X is present, it is given a value of −1. The group contribution of each of $R^1$, $R^2$ and $R^3$ is generally zero for all groups except as follows: if the group is $CH_3COO$, Cl or Br, in which case it is −1, or if it is amine (including an imine), ONa, OK or OLi in which case it is +1. If the sum of the group contributions for X, $R^1$, $R^2$ and $R^3$ is zero, no adjustment with mineral acid or alkali metal hydroxide (or solutions thereof) is necessary. If the sum of the group values is a positive integer, adjustment with mineral acid is desirable, and if it is negative, adjustment with alkali metal hydroxide is desirable.

For example, where $R^1$=$OCH_3$, $R^2$=$CH_3$, $R^3$=Cl and X=Br, the sum of the group values (g.v.) is:

$$\Sigma = (g.v.\ OCH_3) + (g.v.\ CH_3) + (g.v.\ Cl) + (g.v.\ Br) = (0) + (0) + (-1) + (-1) = -2$$

The negative sign in front of the sum indicates adjustment with alkali metal hydroxide is required. The number of equivalents of alkali required is given by the equivalent balance (EB) which includes the absolute value of the sum of the group contributions ($|\Sigma|$) as a scaling factor:

$$EB = \frac{|\Sigma| \times \text{weight in grams of the chemical added}}{\text{molecular weight of the added chemical}}$$

In continuing the example, if a process according to the present invention were scaled so as to require 6,000 grams of a chemical of Formula I with a molecular weight of 350 grams and the sum of the group values gave −2, EB would be calculated as follows:

$$EB = -2 \times 6000/350 = -34.28 \text{ gram-equivalents}$$

Thus, in this example, 34.28 gram-equivalents of alkali metal hydroxide would be added. Sodium hydroxide is the preferred alkali metal hydroxide. The weight of sodium hydroxide would be:

Weight=(EB)×(Equivalent Weight of NaOH)=34.28×40.0=1371.2 grams

The preferred technique according to the invention is to dissolve the alkali metal hydroxide or mineral acid in water so as to obtain a concentration between 5 and 25% by weight and most preferably between 5 and 10% by weight prior to adding the solution to the slurry.

It is known to incorporate a coupling agent into rubber that is intended to be vulcanized and used, for instance, in tires. Suitable coupling agents include those described in U.S. Pat. No. 4,704,414, published European patent application 0,670,347A1 and published German patent application 4435311A1, the disclosures of each of which are incorporated by reference. One suitable coupling agent is a mixture of bis[3-(triethoxysilyl)propyl]monosulfane, bis[3-(triethoxysilyl)propyl]disulfane, bis[3-(triethoxysilyl)propyl]trisulfane and bis[3-(triethoxysilyl)propyl]tetrasulfane and higher sulfane homologues—for example, coupling agents available under the trade names Si-69 (average sulfane 3.5), Silquest™ A-1589 or Si-75 (average sulfane 2.0). Another non-limiting examples of a suitable coupling agent is bis[2-(triethoxysilyl)ethyl]-tetrasulfane, available under the trade name Silquest RC-2. In the past, achieving a good balance between the coupling agent and particles, such as silica, without scorching or premature curing has proven difficult. In accordance with the invention, if particles, particularly silica particles, are being treated to render them hydrophobic for use in rubber which is subsequently to be vulcanized, it is possible to include a step of adding a coupling agent in the process of the invention, so that the coupling agent becomes attached to the surface of the hydrophobicized mineral particles and becomes dispersed in the rubber with the mineral particles.

Thus, in some preferred embodiments of the invention, a coupling agent is added to the dispersion, more preferably after the addition of the compound of Formula I but before the compound of Formula II is added. As discussed above, in some cases, Formulae I and II may represent the same compound. In these cases, it is preferred to add the coupling agent between sequential additions of the compound of Formulae I and II.

The coupling agent may be added after any addition of mineral acid or alkali metal hydroxide that is indicated by the calculation of the EB. Non-limiting examples of suitable coupling agents include compounds of formula:

$R^8R^9R^{10}MR^{11}$ in which at least one of $R^8$, $R^9$ and $R^{10}$, preferably two of $R^8$, $R^9$ and $R^{10}$ and most preferably $R^8$, $R^9$ and $R^{10}$, are hydroxyl or hydrolysable groups. The groups $R^8$, $R^9$ and $R^{10}$ are bound to the atom M, which is silicon, titanium or zirconium. The group $R^8$ may be hydroxyl or $OC_pH_{2p}+1$ where p is from 1 to 10 and the carbon chain may be interrupted by oxygen atoms, to give groups, for example, of formula $CH_3OCH_2O$—, $CH_3OCH_2OCH_2O$—, $CH_3(OCH_2)_4O$—, $CH_3OCH_2CH_2O$—, $C_2H_5OCH_2O$—, $C_2H_5OCH_2OCH_2O$— or $C_2H_5OCH_2CH_2O$—. Alternatively $R^8$ may be phenoxy. If M is titanium or zirconium, $R^8$ may be the neopentyl(diallyl)oxy group, but not if M is silicon. The group $R^9$ may be the same as $R^8$. If M is silicon, $R^9$ may also be a $C_{1-10}$ alkyl group, a phenyl group, or a $C_{2-10}$ mono- or diunsaturated alkenyl group. If M is titanium or zirconium, $R^9$ may be the neopentyl(diallyl)oxy group, but not if M is silicon. Further, $R^9$ may be the same as the group $R^{11}$ described below.

$R^{10}$ may be the same as $R^8$, but it is preferred that $R^8$, $R^9$ and $R^{10}$ are not all hydroxyl. If M is silicon, $R^{10}$ may also be $C_{1-10}$ alkyl, phenyl, $C_{2-10}$ mono- or diunsaturated alkenyl. If M is titanium or zirconium, $R^{10}$ may be the neopentyl (diallyl)oxy group, but not if M is silicon. Further $R^{10}$ may be the same as the group $R^{11}$ described below.

The group $R^{11}$ attached to M is such that it may participate in a crosslinking reaction with unsaturated polymers by contributing to the formation of crosslinks or by otherwise participating in crosslinking. In the case where M is silicon, $R^{11}$ may have one of the following structures: $R^{11}$ may represent the allyl group —$H_2CCH$=$CH_2$, the vinyl group —CH=$CH_2$, the 5-bicycloheptenyl group or the group described by —(alk)$_e$(Ar)$_f$S$_i$(alk)$_g$(Ar)$_h$SiR$^8$R$^9$R$^{10}$ where $R^8$, $R^9$ and $R^{10}$ are the same as previously defined, alk is a divalent straight hydrocarbon group having between 1 and 6 carbon atoms or a branched hydrocarbon group having between 2 and 6 carbon atoms, Ar is either a phenylene —$C_6H_4$—, biphenylene —$C_6H_4$—$C_6H_4$— or —$C_6H_4$—$OC_6H_4$— group and e, f, g and h are either 0, 1 or 2 and i is an integer from 2 to 8 inclusive with the provisos that the sum of e and f is always 1 or greater than 1 and that the sum of g and h is also always 1 or greater than 1. Alternately, $R^{11}$ may be represented by the structures (alk)$_e$(Ar)$_f$SH or (alk)$_e$(Ar)$_f$SCN where e and f are as defined previously. Moreover, it is possible for $R^{11}$ to have the structure —(CH=CH)$_k$(CH$_2$)$_m$(C$_6$H$_4$)$_n$(O)$_o$(CH$_2$)$_p$R$^{13}$ wherein k, m, n and o and p are all whole numbers and $R^{13}$ represents the acryloxy $CH_2$=CHCOO— or the methacryloxy $CH_2$=CCH$_3$COO— group. Further, the value of k may be 0 or 1, m may be from 0 to 20 inclusive, n may be between 0 and 2, o may be 0 or 1, and p may be from 0 to 20 inclusive, with the provisos that the sum of k, m, n and o is at least 1 and not greater than 20, and that if n is 1 or 2 or o is 1, p is 1 or greater. It is most preferable that m=3 and k, n, o and p are all 0.

Preferably, $R^8$, $R^9$ and $R^{10}$ are all either $OCH_3$, $OC_2H_5$ or $OCH_8$ groups and most preferably all are $OCH_3$ groups. It is most preferred that the coupling agent is bis[3-(trimethoxysilyl)propyl]tetrasulfane (Si-168). The amount of coupling agent to add is optional; levels between 2 and 10 percent by weight of the silica in the slurry (dry basis) are preferred. The dispersion of the chemical may be effected by mixing.

Non-limiting illustrative examples of other coupling agents include the following: bis[(trimethoxysilyl)propyl)] disulfane (Si-166), bis[(triethoxysilyl)propyl)]-disulfane (Si-266), bis[2-(trimethoxysilyl)ethyl]-tetrasulfane, bis[2-(triethoxysilyl)ethyl]trisulfane, bis[3-(trimethoxysilyl) propyl]disulfane, 3-mercaptopropyltrimethoxysilane, 3-mercaptopropylmethyldi-ethoxysilane, 3-mercaptoethylpropylethoxymethoxysilane, 1,3-bis(3-acryloxypropyl)tetramethoxydisiloxane, acryloxypropylmethyldimethoxysilane, 3-methacryloxypropyl-trimethoxysilane, allyltrimethoxysilane, diallyldiethoxysilane, 5-(bicycloheptenyl)triethoxysilane, 5-(bicycloheptenyl) methylmethoxyethoxysilane, isopropoxytriacryltitanate, diisopropyldimethacryltitanate, diethoxydi(3-mercaptopropoxy)zirconate, triisopropoxy-(2-mercaptoethoxy)zirconate, and di[neopentyl(diallyl)oxy]-di (3-mercaptopropoxy)-zirconate.

Other preferred coupling agents include those disclosed in published German patent application 44 35 311 A1, On pages 2 and 3, there is disclosure of oligomers and polymers of sulphur containing organooxysilanes of the general formula:

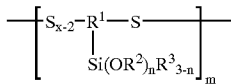

in which $R^1$ is a saturated or unsaturated, branched or unbranched, substituted or unsubstituted hydrocarbon group that is at least trivalent and has from 2 to 20 carbon atoms, provided that there are at least two carbon-sulphur bonds, $R^2$ and $R^3$, independently of each other, are saturated or unsaturated, branched or unbranched, substituted or unsubstituted hydrocarbon groups with 1 to 20 carbon atoms, halogen, hydroxy or hydrogen, n is 1 to 3, m is 1 to 1000, p is 1 to 5, q is 1 to 3 and x is 1 to 8.

Preferred compounds are of the general formula

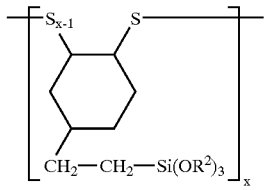

wherein $R^2$, m and x have the meanings given above, and $R^2$ is preferably methyl or ethyl. These compounds disclosed in German Patent Application No. 44 35 311 A1 are preferred coupling agents for use in the present invention.

Also preferred for use in this invention are coupling agents disclosed in the abovementioned published European patent application 0,670,347A1, which discloses coupling agents of the general formula:

$$R^1R^2R^3S^i-X^1-(-S_x-Y-)_m-(-S_x-X^2-SiR^1R^2R^3)_n$$

in which $R^1$, $R^2$ and $R^3$ are the same or different and are $C_{1-8}$ alkyl, $C_{1-8}$ alkoxy, phenyl or phenoxy, provided that at least one of $R^1$, $R^2$ or $R^3$ is an alkoxy or phenoxy group. $X^1$ and $X^2$ are the same or different and are divalent linear or branched, optionally unsaturated $C_{1-12}$ alkyl groups, Y is a di-, tri- or tetravalent linear, branched or cyclic $C_{1-18}$ alkyl group that is optionally unsaturated and is optionally substituted by $C_{6-12}$ aryl, $C_{1-8}$ alkoxy or hydroxy groups and which can be interrupted by oxygen, sulphur or nitrogen atoms or aromatic $C_{6-12}$ aryl groups, or Y is a $C_{6-12}$ aryl or heteroaryl group, m is an integer from 1 to 20, n is an integer from 1 to 6 and x is an integer from 1 to 6.

Particularly preferred coupling agents are those of the following general formulae:

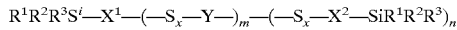

in which R=—$CH_3$ or —$C_2H_5$, x=1–6 and n=1–10;

in which R=—$CH_3$ or —$C_2H_5$, x=1–6 and n=1–10;

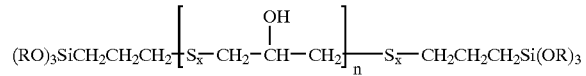

in which R=—$CH_3$, —$C_2H_5$ or —$C_3H_7$, n=1–10 and x=1–6;

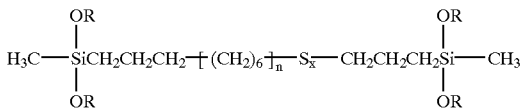

in which R=—$CH_3$, —$C_2H_5$ or —$C_3H_7$, n=1–10 and x=1–6;

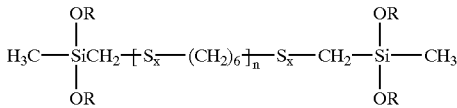

in which R=—$CH_3$, —$C_2H_5$ or —$C_3H_7$, n=1–10 and x=1–6;

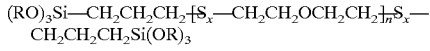

in which R=—$CH_3$, —$C_2H_5$, —$C_3H_7$, n=1–10 and x=1–6;

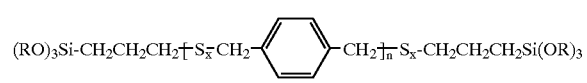

in which R=—$CH_3$, —$C_2H_5$, or —$C_3H_7$, n=1–10 and x=1–6;

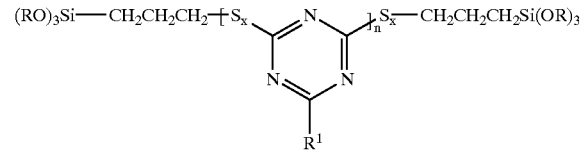

in which R=—$CH_3$, —$C_2H_5$, or —$C_3H_7$; $R^1$=—$CH_3$, —$C_2H_5$, —$C_3H_7$, —$C_6H_5$, —$OCH_3$, —$OC_2H_5$, —$OC_3H_7$ or —$OC_6H_5$, n=1–10 and x=1–8; and

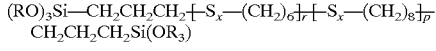

in which R=—$CH_3$, —$C_2H_5$ or —$C_3H_7$, r+p=2–10 and x=1–6;

Especially preferred are coupling agents of the formulae:

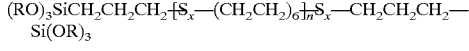

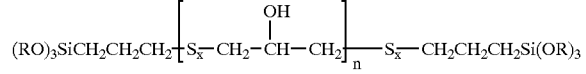

in which x is 1–6 and n is 1–4.

In Step (b) of the present process, the compound of Formula II is added to the particulate filler material. Again, it is preferred that the particulate filler material, more preferably a mineral filler, is in the form of an aqueous slurry or a dispersion, and the compound of Formula II is added to the slurry or dispersion under intense mixing. In the compound of Formula II the possible and preferred values for $R^{15}$, $R^{16}$ and $R^{17}$ are the same as the possible and preferred values for $R^1$, $R^2$ and $R^3$ that are discussed above in relation to Formula I. If $R^{12}$ is an amino group of formula —$R^{18}$—$NR^{19}R^{20}$, preferred values for $R^{18}$ are such that N—$R^{18}$—Si includes groups of the formula:

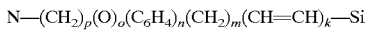

in which k is 0 or 1, m is 0 to 20 inclusive, n is 0, 1 or 2, o is 0 or 1 and p is 0 to 20 inclusive, provided that the sum of k, m, n, o and p is at least 1 and not greater than 20, and further provided that if o is 1, p is also 1 or greater, and the sum of k, m and n is 1 or greater. The order of the moieties between N and Si is not particularly restricted other than neither N or O should be directly bound to Si. There should be no hydrolysable group between the silicon and nitrogen atoms. Preferably k, n, o and p are all 0 and m is 3, i.e. $R^{18}$ is —$CH_2CH_2CH_2$—.

$R^{12}$ may be a moiety containing at least one primary, secondary, or tertiary amine nitrogen. In this case the amino group bonded to $R^{18}$— is given by the formula —$NR^{19}R^{20}$. $R^{19}$ may be a H or a $C_{1-40}$ alkyl group or a $C_{2-40}$ mono-, di- or tri-unsaturated alkenyl group. $R^{19}$ may also be a $C_{1-20}$ alkyl-substituted or $C_{2-20}$ alkenyl-substituted aromatic group. The aromatic group may be, for example, the phenylene group —$(C_6H_4)$13 , the biphenylene group —$(C_6H_4)$—$(C_6H_4)$—, the —$(C_6H_4)$—O—$(C_6H_4)$— group, or the naphthylene group —$(C_{10}H_6)$—. $R^{20}$ may be one of the same groups as $R^{19}$ with the further proviso that at least one of $R^{19}$ and $R^{20}$ must contain a continuous carbon chain of at least 8 carbons in length, uninterrupted by any heteroatoms.

As stated above, if $R^{19}$ and $R^{20}$ are other than hydrogen, the carbon atom attached to the nitrogen atom is not tertiary. Preferably the carbon atom attached to the nitrogen atom is primary, i.e., —$CH_2$—.

It is preferred that $R^{19}$ is a mono-unsaturated alkenyl group of 12–20 carbons in length and most preferable that $R_{19}$ is a monounsaturated alkenyl group of 16 to 18 carbons in length. It is most preferable also that $R^{20}$ is H.

Alternatively, $R^{12}$ may be a moiety which contains a mineral acid salt or a quaternary ammonium salt of an amine. The formula of $R^{12}$ may thus be described by the extended formula —$R^{18}$—$NR^{19}R^{20}$-$R^{21}$x wherein —$R^{18}$—, $R^{19}$ and $R^{20}$ are as previously defined and $R^{21}$ may be a H, or a $C_{1-40}$ alkyl or $C_{2-40}$ mono-, di- or tri-unsaturated alkenyl group and X is an anion, preferably Cl or Br, although sulphate can be used.

There is the further proviso that at least one of $R^{19}$ and $R^{20}$ must contain a continuous carbon chain of at least 8 carbons in length, uninterrupted by any heteroatom. It is preferred to use an amine salt where $R^{19}$ is a mono- or di-unsaturated alkenyl group of 12–20 carbons in length and most preferably that $R^{19}$ is a mono- or di-unsaturated alkenyl group of 16 to 18 carbons in length. It is most preferable also that $R^{20}$ is H and that $R^{21}$ is H and X is chlorine. The preferred hydrophobicizing agent of Formula II is N-oleyl-N-(3-trimethoxysilyl)propyl ammonium chloride.

Preferably, the amount of the hydrophobic compound of Formula II to add is generally between 0.5 and 20 percent by weight of the weight of the particles (preferably mineral particles such as silica) in the slurry (dry basis), and is inversely proportional to the particle size of the silica particles. The compound may be added to the slurry in its natural state, either as a liquid or a solid. However, to facilitate dispersion, it is preferred, where possible, to add the compound as a liquid. If the melting point of the compound is below 95 degrees Celsius, it is preferred to add it to the slurry in a molten state at a temperature at least 5 degrees Celsius above the melting point, provided the temperature of the compound in the liquified state does not exceed 100 degrees Celsius and provided that the compound does not decompose under these conditions. If the melting point exceeds 95 degrees Celsius, it is most preferred to use a solvent. Suitable solvents are alcohols containing 1 to 5 carbon atoms and most preferably those containing 1 to 3 carbon atoms, that is to say methanol, ethanol, n-propanol or isopropanol. If the compound of Formula II is an alkoxysilane, most preferably the alkoxy group of the solvent alcohol will be the same as the alkoxy group of the alkoxysilane. For example, if the compound of Formula II is a methoxysilane, the preferred solvent is methanol. The concentration of the compound in the solvent may be from 10 to 90 percent by weight and most preferably between 25 and 75 percent by weight and most preferably 50 percent by weight. Preferably, the solution is prepared and added to the slurry at a temperature between a lower limit of 0 degrees Celsius and an upper limit which is the lower of at least 10 degrees below the boiling point of the solvent and 95 degrees Celsius.

After the addition of the hydrophobic compound of Formula II which is added, the equivalent balance (EB) should be calculated to determine how much, if any, mineral acid or alkali metal hydroxide (or solutions thereof) to add. The equivalent balance (EB) may be determined from the absolute value of the sum of the group values of X, $R^{15}$, $R^{16}$ and $R^{17}$ and the weight added, and the molecular weight of the compound, according to the following scheme: The group contribution of X for either X=Cl or X=Br is −1, thus if X is present it is given a value of −1. The group contribution of each of $R^{15}$, $R^{16}$ and $R^{17}$ is generally zero for all groups except as follows: if the group is $CH_3COO^\ominus$, $Cl^\ominus$ or $Br^\ominus$, in which case it is −1, or if it is amino, ONa, OK, or OLi in which case it is +1. If the sum of the group contributions for X, $R^{15}$, $R^{16}$ and $R^{17}$ is zero, no adjustment with mineral acid or alkali metal hydroxide (or solutions thereof) is necessary. If the sum of the group values is a positive integer, adjustment with mineral acid is desirable, and if it is negative, adjustment with alkali hydroxide is desirable.

For example, where $R^{15}$=$OC_2H_5$, $R^{16}$=$OCH_3$ $R^{17}$=$CH_3$ and X=Cl, the sum Σ of the group values (g.v.) is:

$$\Sigma=(g.v.\ OC_2H_5)+(g.v.\ OCH_3)+(g.v.\ CH_3)+(g.v.\ Cl)=(0)+(0)+(0)+(-1)=-1.$$

The negative sign in front of the sum indicates adjustment with alkali metal hydroxide is required. The number of equivalents of alkali required is given by the equivalent balance (EB) which includes the absolute value of the sum of the group contributions (|Σ|) as a scaling factor.

$$EB = \frac{|\Sigma| \times \text{weight in grams of the compound added}}{\text{molecular weight of the added chemical}}$$

In continuing the example, if a process according to the present invention were scaled so as to require 3450 grams of a compound of Formula II with a molecular weight of 466 grams and the sum of the group values gave −1, EB would be calculated as follows:

$$EB=|-1|\times 3450/466=7.4\ \text{gram-equivalents}.$$

Thus, in this example, 7.4 gram-equivalents of alkali metal hydroxide would be added. Sodium hydroxide is the preferred alkali metal hydroxide. The weight of sodium hydroxide added would be:

$$\text{Weight}=(EB)\times(\text{Equivalent Weight of NaOH})=7.4\times 40.0=296\ \text{grams}.$$

The preferred technique according to the invention is to dissolve the alkali hydroxide or mineral acid in water so as to obtain a concentration between 5 and 25% by weight and most preferably between 5 and 10% by weight prior to adding the solution to the slurry. The temperature of the solution may be from 0 degrees Celsius to 100 degrees Celsius under atmospheric pressure, or if a pressure vessel is used for preparation of the solution, it may be from 0 degrees Celsius to 130 degrees Celsius. It is preferred that the temperature of the solution be within 10 degrees of the solution of the slurry. The dispersion of the solution in the slurry is effected by mixing.

While not wishing to be bound by any particular theory or mode of action, it is believed that the mechanism of the present process of treating particulate materials can be illustrated as shown in FIGS. 1–4. In this illustrative reaction scheme, silica is shown as the particulate material being treated with a specific compound falling within Formulae I and II defined hereinabove. Of course, FIGS. 1–4 are provided for illustrative purposes only and should not be used to limited the scope of the invention.

With reference to FIG. 1, there is illustrated an initial step in the present process. As illustrated, an adduct of 3-CPTMS/oleylamine[1], preferably in the form of a methanolic solution, is added to an aqueous slurry of silica particles. The methoxy silane linkages in the adduct are readily hydrolysed by water or by contact with the acidic surface silanol groups on the silica resulting in condensation of the adduct on the surface of the silica particles.

[1] N-(3-trimethoxysilylpropyl)-N-(octadec-9-enyl) ammonium chloride, the production of which is discussed in a copending International application filed on even date herewith in the name of the Applicant, the contents of which are hereby incorporated by reference.

Figure 2:
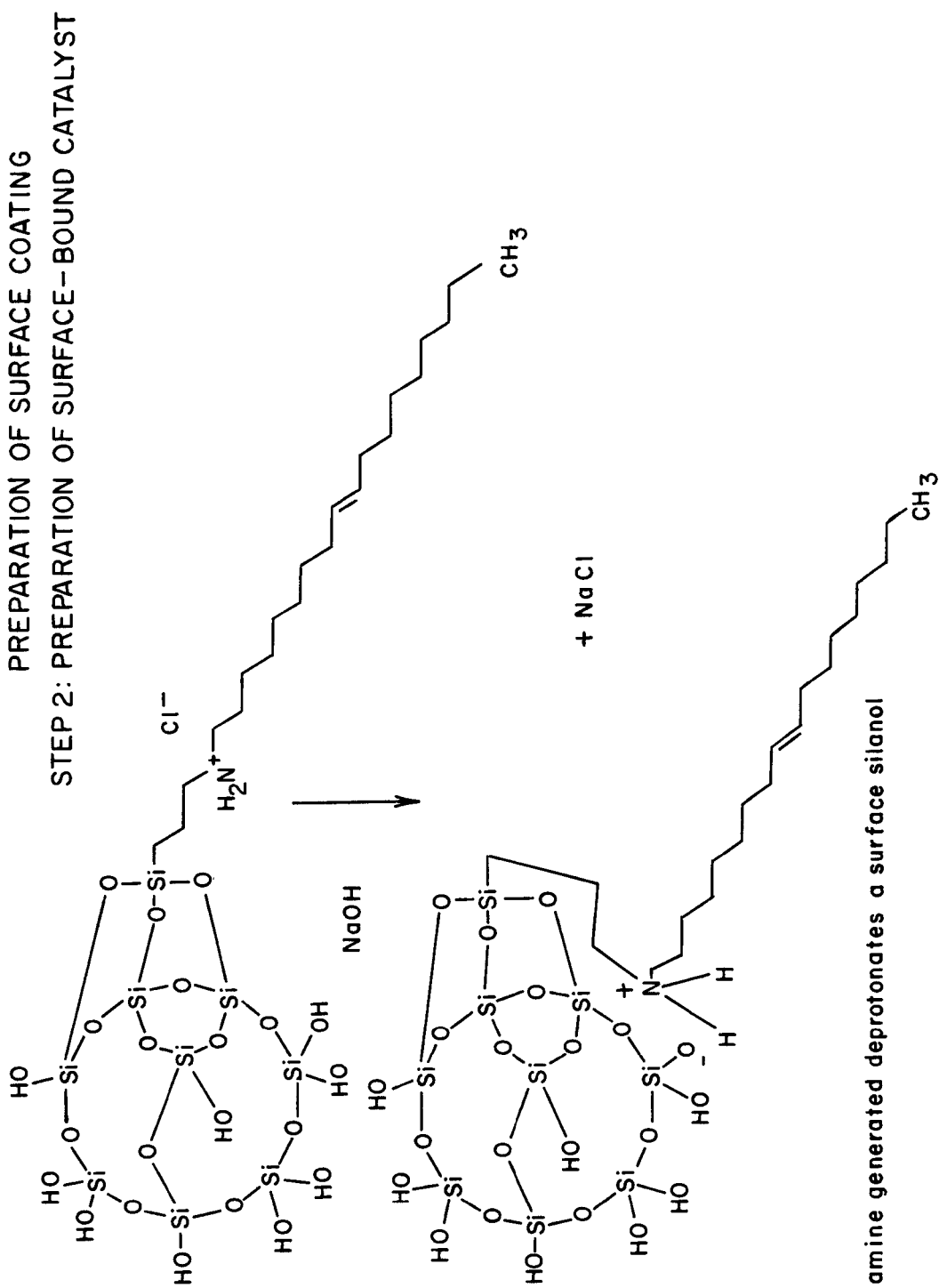

With reference to FIG. 2, a preferred step in the present process is illustrated. Specifically, an active surface-bound catalyst is prepared by neutralization of the hydrochloride salt with a base (NaOH is shown). The strongly basic amine so produced is believed to further react with surface silanols resulting in deprotonation of the latter, as shown.

Figure 3:
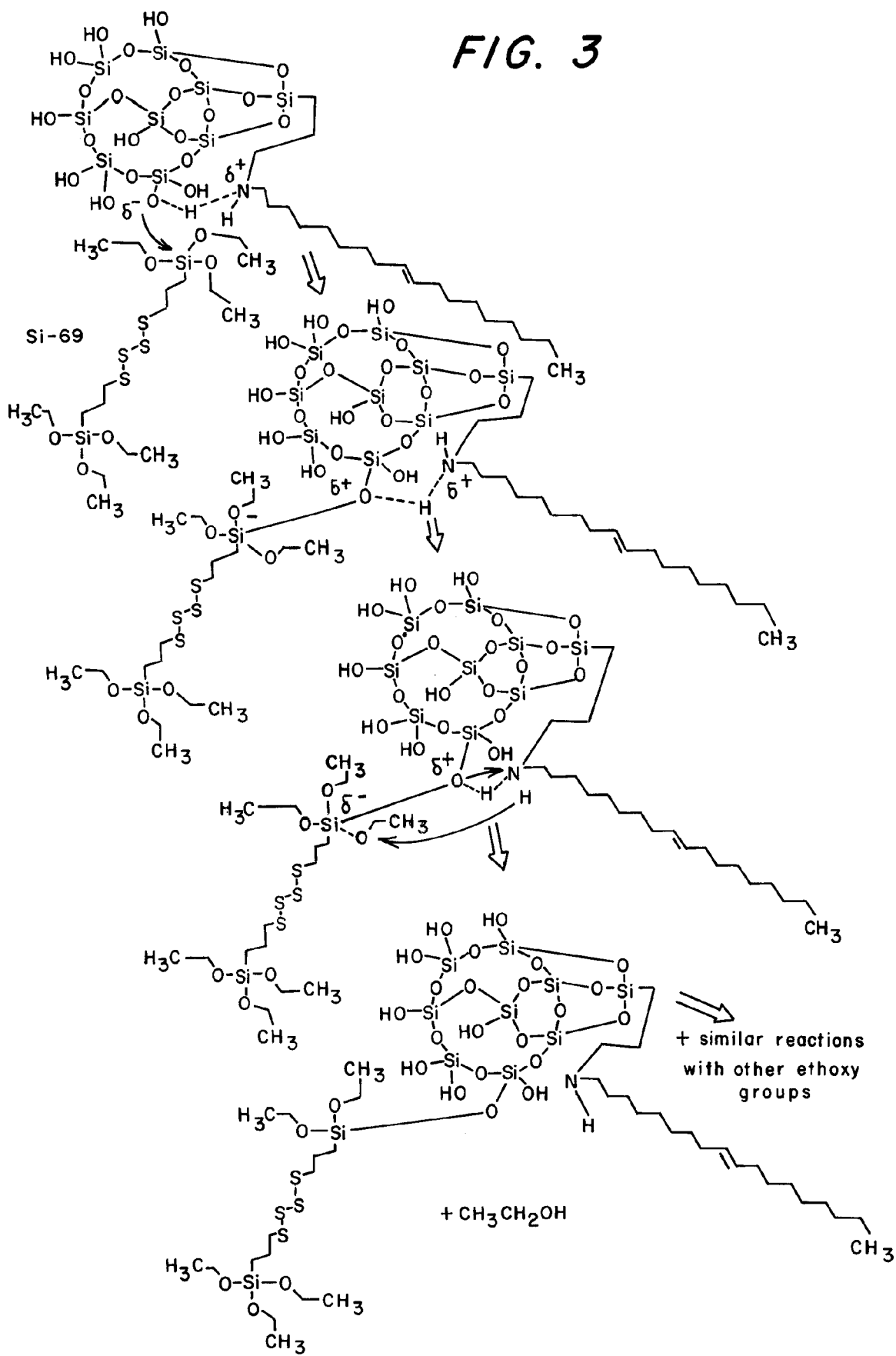

With reference to FIG. 3, another preferred step in the present process is illustrated. Specifically, a coupling agent commercially available under the tradename Si-69[2] is added to the active surface-bound catalyst produced in FIG. 2. Preferably, the coupling agent is added slowly (this minimizes self-condensation) and under high shear conditions (this facilitates dispersion). The deprotonated silanol groups readily react with the ethoxy moieties on the Si-69 releasing ethanol and regenerating the active catalyst (not shown). The process continues until the Si-69 coupling agent has reacted. The condensed Si-69 moieties may link several silica particles together (see FIG. 4 and discussion below) or, in the case of larger particles or agglomerates, substantially all condensed endgroups may be attached to the same particle.

[2] While bis[3-(triethoxysilyl)propyl]tetrasulfane is shown in FIG. 3, as discussed hereinabove, those of skill in the art recognize that Si-69 is mixture of bis[3-(triethoxysilyl)propyl]monosulfane, bis[3-(triethoxysilyl)propyl]disulfane, bis[3-(triethoxysilyl)propyl]trisulfane and bis[3-(triethoxysilyl)propyl]tetrasulfane (average sulfane 3.5).

Figure 4:
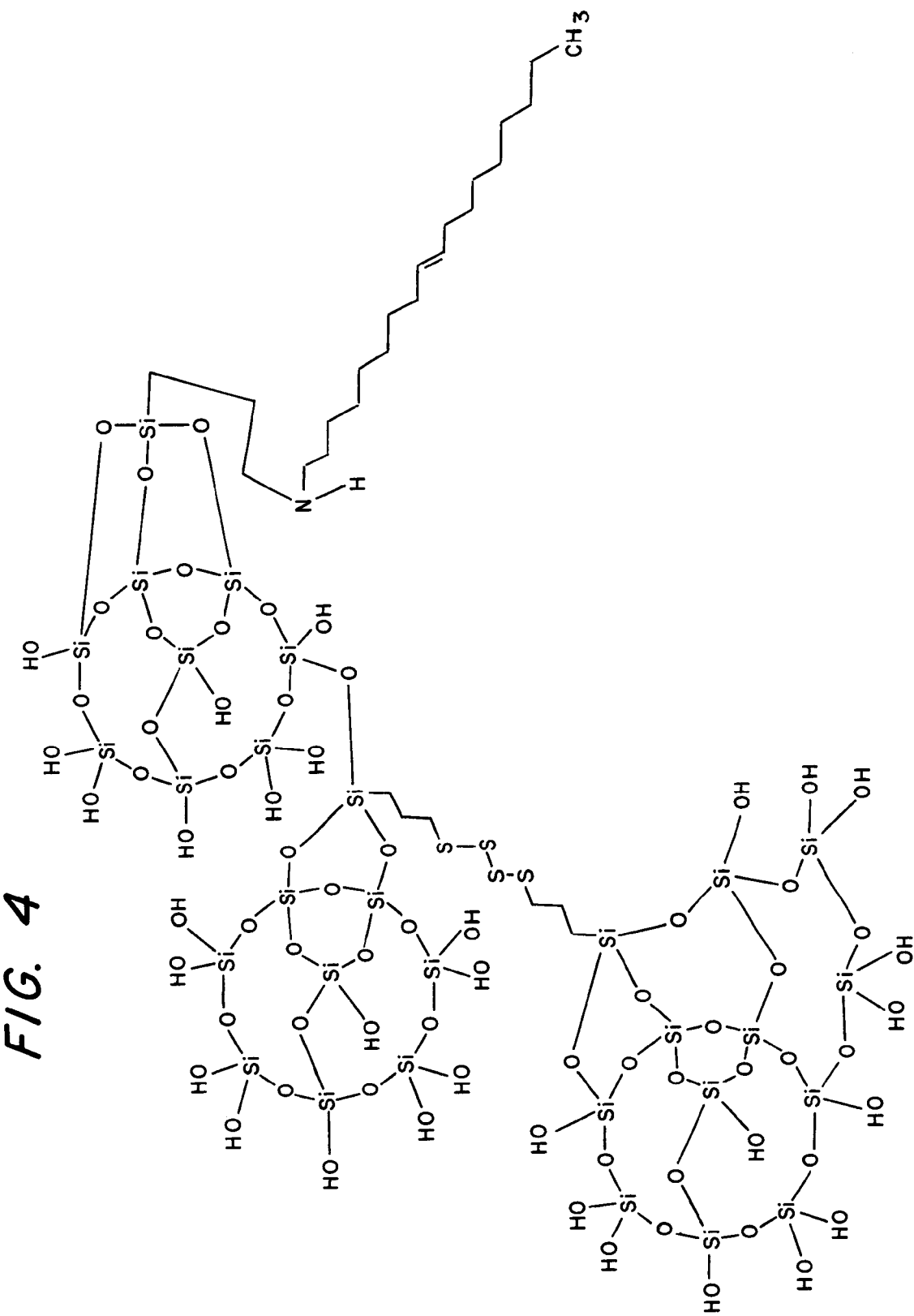

With reference to FIG. 4, after sufficient time has been allowed for the Si-69 coupling agent to react to completion, additional 3-CPTMS/oleylamine adduct is added to react with most of the remaining residual silanol groups (FIG. 1). Preferably, this is again followed by neutralization with a base (FIG. 2). The long alkyl groups now attached to the surface of the silica particle render the particle strongly hydrophobic and thus more compatible with, inter alia, a hydrocarbon polymer cement. Further, the bulky alkyl groups attached to the silica particles serve to sterically limit the interaction of water molecules with the surface.

The process described thus far provides an aqueous slurry or dispersion of hydrophobicized silica (i.e., it has not yet been contacted with an elastomer or other substrate to be filled), which can be used as such or can be filtered and dried. Hydrophobicized silica can be used as a filler in a multitude of materials including, but not limited to, the following: elastomers, alkyd paints, as a component of antifoaming preparations or foam regulators in laundry detergents, or as toners such as those used in photocopiers, and rubber vulcanizates. Mention is made particularly of tire treads and of shoe soles.

In a preferred embodiment of this invention the hydrophobicized silica, in the aqueous dispersion or slurry, is incorporated into a polymer, for example an elastomer to form a rubber masterbatch. It is particularly preferred that the hydrophobicized silica shall have been treated with a coupling agent, for example Si-69, Si-168 or Silquest RC-2, as discussed above. The slurry is mixed with a hydrocarbon or other solution of the elastomer. Preferably, the solvent in which the elastomer is dissolved is immiscible with, or mostly immiscible with, water to form a preblend. This elastomer solution may be made by dissolving the solid elastomer in a solvent, or it may be the solution resulting from the polymerisation of monomers in the solvent. The elastomer may be a hydrocarbon rubber, a graft polymer or block polymer of monomers having at least one ethylenically unsaturated bond and polymerizable through this unsaturation. Other suitable polymers include, but are not limited to IIR, HIIR, IR, EPDM, SBR, BR, NBR, HNBR, HSRE, natural rubber, polystyrene, polychloroprene, epichlorohydrin (ECO), chlorinated polyethylene, silicone and ABS. Suitable solvents include but are not limited to cyclohexane, hexane, benzene, toluene and pentane. Optionally, processing oil and antioxidants may be added to the hydrocarbon solution prior to mixing with the slurry, or they may be added after mixing the slurry and the elastomer solution.

The viscosity of the final elastomer solution, sometimes referred to as an elastomer cement, containing the optional ingredients is preferably such that it closely matches the viscosity of the silica slurry and is generally between 1,000 and 50,000 centipoise. The temperature of the elastomer solution is preferably the same as that of the slurry and the amount of cement that is added is such that the final masterbatch may contain from 5 to 250 parts of silica per hundred parts of elastomer, preferably from 35 to 100 parts of silica per hundred parts of elastomer, most preferably from 60 to 80 parts of silica per hundred parts of elastomer.

The elastomer cement and, optionally, oil and antioxidants, is mixed with the silica slurry until the mixture becomes homogeneous and the milky colour of the silica slurry disappears to form a preblend. A small amount of water may separate at this stage.

If not added previously, or if additional amounts are desired, oil and antioxidants may be added next and the mixing continued further until the oil and antioxidant become incorporated in the continuous phase.

Any water which separates from the preblend may be removed, discarded or recycled for silica slurry make-up by stopping the agitator for a suitable period and allowing the water phase to accumulate in the bottom of the mixing tank from which it may be drained prior to proceeding with the next step. Agitation is preferably restarted after the water layer is removed.

If antioxidants and processing oil were not previously added, or if additional amounts are desired, they may be added at this stage and stirring continued until the preblend is again homogeneous.

The preblend is then added to water heated to a temperature equal to, or preferably higher than the boiling point of the solvent used for the elastomer cement so as to remove the solvent and produce a masterbatch coagulum in the form of a crumb suspended in water. The preferable temperature of the water prior to addition of the preblend is between 50 and 100 degrees Celsius, most preferably between 90 and 95 degrees Celsius, and the preblend is added at a rate so as to maintain a so-fixed or reasonably so-fixed water temperature throughout the coagulation. The agitation is set sufficiently high so as to maintain the crumb in a suspended state within the water but not so high as to cause the crumb to subdivide into particles smaller than approximately 5 millimeters.

The solvent may be recovered from the coagulator by recondensing the vapours. The material containing the suspended crumb is passed through a filter screen sized so as to recover the wet masterbatch. The material passing through the screen may be optionally recycled for further silica slurry make-up.

The wet crumb is dried such as by using forced air or fluidized bed or microwave drying techniques at a temperature between about 75 and about 135 degrees Celsius, preferably between about 85 and about 120 degrees Celsius, most preferably between about 85 and about 105 degrees Celsius, until a suitably dry masterbatch crumb is obtained.

The dried crumb may be further processed according to industry and customer requirements.

Figure 5:
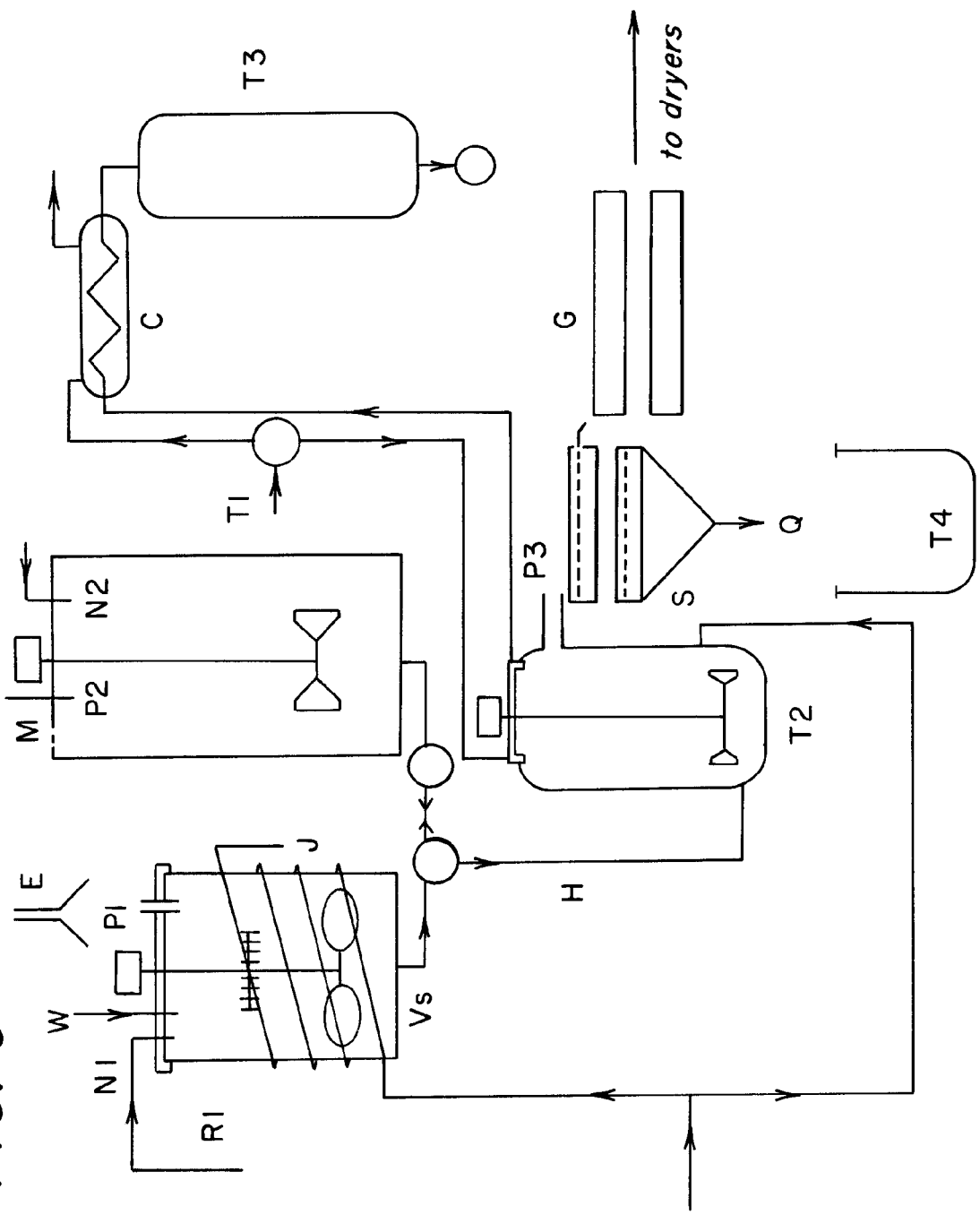
FIG. 5 illustrates a schematic of a system used to conduct the present process in the Examples hereinbelow.

Preferred embodiments of the invention are illustrated by the examples which follow. The examples can be interpreted with the aid of FIG. 5 which illustrates an arrangement for carrying out a masterbatch process embodiment of the invention, according to Examples I and II The legend in FIG. 5 is as follows:

R1: A balance-mounted portable paint pot of nominal capacity 120 liters. The pot is equipped with a Strahman (piston) bottom valve (Vs), an oversized air-operated motor, one 6-inch radial flow agitator (top) and one 10-inch marine impeller (bottom) on a single shaft, and an external steam coil (J) for heating. The lower impeller has approximately 2 inches of clearance from the bottom of R1; the top impeller is attached at a point 9 inches higher. A valved chemical addition port (P1) is available on the removable lid and the pot may be purged with nitrogen through another port (N1) when transfer of the contents is required. A water line may be coupled to an additional port (W). A portable exhaust snorkel (E) is available in the vicinity to remove fugitive methanol and ethanol emissions. R1 is used for the silica slurry makeup and as a vessel to carry out the described additions to produce a hydrophobicized silica slurry.

T1: A nominal 500 USG glass-lined chemical reactor used for cement make-up and storage and as a mixing vessel for the silica slurry and polymer cement prior to coagulation. It is equipped with a 200 rpm pneumatic drive, a marine impeller and heating jacket to speed dissolution of rubbers. It has various addition ports including: M, a small manhole for introducing rubber and oil, P2, for solvent (hexane) addition, a nitrogen line port (N2) for pressure transfer of the contents through a large bottom drain with a valve (V2). The bottom valve is located a short distance from the tank bottom in order to reduce dead space in the piping.

H: Armoured flex hose, 2 inch diameter, for slurry and cement transfers.

V1: A 3-way valve to control the direction of flow.

T2: A steam coagulator of nominal capacity 400 liters. It is equipped with a steam sparge port near the bottom and a connection to service water. An overflow port (P3) and overflow channel are situated close to the top to allow for product discharge. A large pipe at the top directs solvent vapours to a condenser (C). The tank is stirred by means of an air operated motor and an 8-inch diameter marine impeller. S: A 24-inch diameter Sweco® shaker screen (100 mesh).

C: A condenser for solvent recovery from coagulation. It is connected to cold process water through a valve (V4).

T3: A solvent decanter, approx. 250 USG, for recycle solvent storage and water separation. A valve (V3) allows for sampling and water discharge.

T4: A 60 liter plastic tank for fines settling.

G: Perforated trays for product dewatering and drying.

Ex: A short (24" long, 3-inch diameter screw) dewatering extruder "Rocket" powered by an explosion proof motor via a variable speed gearbox.

Embodiments of the present invention will be described with reference to the following Examples which should not be used to limit the scope of the invention.

EXAMPLE I

1) Cement Preparation

A hydrocarbon solution of polybutadiene (~16 wt %) was prepared by adding 66.9 kg of a high cis-polybutadiene rubber (Taktene 1203), previously cut into small pieces, to 351 kg cyclohexane in T-1. The mixture was stabilized by adding 0.5 kilos each of a hydroperoxide scavenger (Polygard) and a hindered phenol antioxidant (Irganox 1076) and dissolution was effected by heating to 60 degrees Celsius with stirring for 2 days. It was then allowed to cool to ambient temperature in the absence of agitation.

2) Hydrophobicized Silica Slurry Preparation

The recipes/procedures used are shown in Table I, which follows.

The agitation rate on R1 was set at ~250 rpm during all steps on each of the four days.

TABLE 1

Preparation of Hydrophobicized Silica Slurry

| Sub-Step Parameters: | DAY 1 | DAY 2 | DAY 3 | DAY 4 |
|---|---|---|---|---|
| a) Slurry preparation | | | | |
| Water (kg) | 53.5 | 53.5 | 53.5 | 53.5 |
| Water Temperature (° C.) | 65 | 64 | 61 | 58 |
| HiSil-233 silica (kg) | 13.4 | 13.4 | 13.4 | 13.4 |
| Stirring time (mins) | 5 | 5 | 5 | 5 |
| Final Temperature (° C.) | 58 | 57.8 | 56.2 | 52 |
| b) Addition of compound of Formula I as the hydrochloride salt: (N-oleyl-N-(3-trimethoxysilyl)propyl ammonium chloride at 50 wt % in methanol) | | | | |
| Added (grams of 50% soln.) | 133.8 | 133.8 | 133.8 | 133.8 |
| Addition period (mins) | 5 | 5 | 5 | 5 |
| Temp. at addition (° C.) | 58 | 57.8 | 56.2 | 52 |
| (c) Addition of caustic after calculation of the equivalent balance (EB) | | | | |
| Caustic concentration (NaOH/H$_2$O, g/g) | 5.5/66 | 5.5/66 | 5.5/66 | 5.5/66 |
| Addition period (mins) | 5 | 5 | 5 | 5 |
| Temp. at addition (° C.) | 58 | 57.8 | 56.2 | 52 |
| (d) Addition of the coupling agent, bis(triethoxysilylpropyl)tetrasulfane (Si-69) to the silica surface | | | | |
| Si-69 weight, kgs. | 1.07 | 1.07 | 1.07 | 1.07 |
| Addition period, mins | 30 | 30 | 30 | 30 |
| Reaction time (hours) | 1.25 | 1.25 | 1.5 | 1.5 |
| Initial Temperature (° C.) | 58 | 57 | 56 | 52 |
| (e) Addition of compound of Formula II as the hydrochloride salt: (N-oleyl-N-(3-trimethoxysilyl)propyl ammonium chloride at 50 wt % in methanol | | | | |
| Amt. Added (kgs 50% soln.) | 1.2 | 1.2 | 1.2 | 1.2 |
| Addition period (mins) | 5 | 5 | 5 | 5 |
| Reaction time (mins) | 5 | 5 | 5 | 5 |

TABLE 1-continued

Preparation of Hydrophobicized Silica Slurry

| Sub-Step Parameters: | DAY 1 | DAY 2 | DAY 3 | DAY 4 |
|---|---|---|---|---|
| (f) Addition of caustic after calculation of Equivalent Balance | | | | |
| Caustic concentration (NaOH/H$_2$O, grams/grams) | 52.2/660 | 52.2/500 | 52.2/660 | 52.2/660 |
| Addition period (mins) | 5 | 5 | 5 | 5 |
| Reaction time (mins) | 5 | 5 | 5 | 5 |

3) Cement/Silica slurry mixing

On day 1, the first batch prepared slurry was added to the cement in T1 by vacuum transfer. Four liters of water were used to wash down the sides of R1 and the washings were similarly transferred. No agitation was used on T1. On day 2 and day 3 the process was repeated. On day 4 20.0 kg. of Sundex 8125 aromatic process oil was added to T1 from a top manhole. The final batch of silica slurry was then added and the agitator speed was increased to 200 rpm and heat was applied to the jacket on T1. After a temperature of 50 degrees Celsius had been attained, the heating and agitation were stopped and the reactor was allowed to remain in a quiescent state for 30 minutes.

4) Coagulation

The mixture in T1 was pressurised by nitrogen directly into T2 coagulation vessel maintained at 92–95 degrees Celsius by means of low pressure steam. The air-driven agitator was started at ~50–60 rpm. The low speed gave a crumb size of approximately 1 cm and provided sufficient agitation to prevent the cement from forming a surface cake on the water.

5) Finishing

The crumb from the coagulation vessel T2 was passed over a Sweco shaker screen for preliminary dewatering and then allowed to sit for an hour on an open tray. The initial moisture level measured on the trayed material averaged 54%. Two trays of wet product at ambient temperature were passed once through the dewatering rocket. The feeding characteristics of the material were excellent even at the highest screw speed and it required two operators to manually feed the material to the extruder in order to keep up with the discharge rate. The exit temperature was judged to be approximately 35 degrees Celsius, and the one-pass material had a moisture level of 31.1 %, or approximately 42% reduction in water content. The product was reasonably cohesive with the appearance of long strands of spaghetti. One half of this stranded product was segregated for drying tests and the other half was passed two more times through the extruder to give a further reduction in moisture to a final 16.3%. During the second and particularly third passes, only a small amount of water was recovered from the rear discharge but the product on exiting the extruder periodically squirted water from within the material. The exit temperature of the product on the third pass was approximately 55 degrees Celsius. The 3-pass product had remarkable green strength for a still-wet material and considerable force was required to break the strands manually.

The 20 full trays obtained were then stacked in the forced air dryers maintained at 85 degrees Celsius and dried for 6 hours. The agglomerated dried product cake was passed through a Cumberland grinder to homogenize it and then bagged. Yield was approximately 141 kg., ~96.4% of theoretical.

Characterization/Testing of Product

The moisture levels measured using a moisture balance set at 105 degrees Celsius on the dried unextruded product average 0.27%, on the one-pass material 0.26%, but on the 3-pass material it was still 2.4%.

Ash levels on the finished product, were determined by calcining at 700 degrees Celsius.

The results from the limited characterization of the product are shown below in Table 2.

TABLE 2

Product Characterization

| Tray # | Moisture % | Ash % (700° C.) |
|---|---|---|
| 1 | 0.32 | n/a |
| 2 | n/a | 33.34 |
| 3 | 0.29 | n/a |
| 4 | n/a | 33.69 |
| 5 | 0.23 | n/a |
| 6 | n/a | 32.1 |
| 7 | 0.18 | n/a |
| 8 | 0.24 | 32.3 |
| 9 | n/a | n/a |
| 10 | 0.16 | n/a |
| 11 | 0.29 | n/a |
| 12 | n/a | n/a |
| 13 | 0.32 | n/a |
| 14 | n/a | 30.9 |
| 15 | 0.22 | n/a |
| 16 | 0.27 | n/a |
| 17 | n/a | n/a |
| 18 (one-extruder pass) | 0.26 | 31.62 |
| AVERAGE | 0.25 | 32.3 |

EXAMPLE II

1) Cement Preparation

A solution of an oil extended SBR rubber was prepared by adding Buna VSL 5025-1 (Buna VSL 1950 S25), previously cut into small pieces, to hexane in T1. Dissolution was effected by heating to 60 degrees Celsius with stirring. At the time of the trial, T1 held the equivalent of 62.84 kg of Buna VSL 5025-1 in 183.6 kg of hexane, giving a cement containing 25.5 wt. % polymer plus oil. The cement was stabilized by adding 0.34 kilos each of Polygard and Irganox 1076.

2) Hydrophobicized Silica Slurry Preparation

Two batches of silica slurry were prepared; this was done over a two day period: The recipes/procedures used are shown in Table 3 following. The agitation rate on R1 was set at ~250 rpm during all steps on both days.

TABLE 3

Preparation of Hydrophobicized Silica Slurry

| Sub-Step Parameters: /Date | DAY 1 | DAY 2 |
|---|---|---|
| (a) Slurry preparation | | |
| Water (kg) | 85.34 | 60.71 |
| Water Temperature (° C.) | 60 | 60 |
| HiSil-233 silica (kg) | 21.37 | 15.2 |
| Stirring time (mins) | 5 | 5 |
| Final Temperature (° C.) | 52 | 52 |
| (b) Addition of a compound of Formula I as the hydrochloride salt: (N-oleyl-N-(3-trimethoxysilyl)propyl ammonium chloride at 50 wt % in methanol | | |
| Added (grams of 50% soln.) | 213.6 | 151.9 |
| Addition period (mins) | 5 | 5 |
| Temp. at addition (° C.) | 52 | 52 |
| (c) Addition of caustic after calculation of equivalent balance | | |
| Caustic concentration (NaOH/H$_2$O), grams/grams) | 8.55/75 | 6.08/50 |
| Addition period (mins) | 5 | 5 |
| Temp. at addition (° C.) | 52 | 52 |

TABLE 3-continued

Preparation of Hydrophobicized Silica Slurry

| Sub-Step Parameters: /Date | DAY 1 | DAY 2 |
|---|---|---|
| (d) Addition of coupling agent Si-69 to the silica surface: | | |
| Si-69 weight, kgs. | 1.71 | 1.21 |
| Addition period, mins | 30 | 30 |
| Reaction time (hours) | 1.25 | 1.25 |
| Initial Temperature (° C.) | 52 | 52 |
| Final Temperature (° C.) | 48.6 | 46.6 |
| (e) Addition of compound of Formula II as the hydrochloride salt (N-oleo-N-(3-trimethoxysilyl)propyl ammonium chloride at 50 wt % in methanol | | |
| Amt. Added (kgs 50% soln.) | 1.92 | 1.37 |
| Addition period (mins) | 5 | 5 |
| Temp. at addition (° C.) | 48.6 | 46.6 |
| Reaction time (mins) | 5 | 5 |
| Final Temperature (° C.) | 47.2 | 46 |
| (f) Addition of caustic after calculation of equivalent balance | | |
| Caustic concentration (NaOH/H$_2$O, grams/grams) | 83.1/700 | 59.3/500 |
| Addition period (mins) | 5 | 5 |
| Temp. at addition (° C.) | 47.2 | 46 |
| Reaction time (mins) | 5 | 5 |
| Final Temperature (° C.) | 47 | 45.4 |

3): Cement/Silica slurry mixing

On day 1 the first batch prepared slurry was added to the 60 degrees Celsius cement in T1 by vacuum transfer. Four liters of water were used to wash down the sides of R1 and the washings were similarly transferred. T1 was stirred under mild agitation and 60 degrees Celsius thermostatting overnight. On day 2, the second batch of slurry was added to T1, again by vacuum transfer, R1 was washed again with 4 liters of water and the washings added to T1. The agitator speed was increased to 200 rpm for 10 minutes after which agitation was stopped. After standing for 15 minutes, some of the water layer from the bottom of T1 was cautiously removed to ascertain the extent of transfer of the silica to the cement (organic phase). The first 2 liters of the water phase contained an estimated 150 grams of coated silica from the piping dead space in front of the valve. The remainder of the water phase was clear although slightly yellowish. Following the sampling, the vessel T1 was again put under mild agitation in preparation for coagulation. Due to the minor amount of untransferred silica, no corrections were made to the formulation.

4) Coagulation

The mixture in T1 was pressurised by nitrogen directly into T2 coagulation vessel maintained at 92–95 degrees Celsius by means of low pressure steam. The agitator speed was adjusted downward to ~100 rpm and finally to ~50–60 rpm. The low speed was found adequate to maintain a crumb size of approximately 1 cm while still preventing the preblend from forming a surface cake on the water. A flow rate of 1 kg/min of material from T1 into the coagulator was found satisfactory to devolatilize the crumb. The entire contents of T1 were coagulated in one pass.

5) Finishing

The crumb from the coagulation vessel T2 was passed over a Sweco shaker screen for preliminary dewatering and then allowed to sit for an hour on an open tray. The initial moisture level measured on the trayed material was 60–65%. The 18 full trays obtained were then stacked in the forced air dryers maintained at 85–90 degrees Celsius and dried for 4–6 hours. During this period the product was turned over once by hand to provide even drying. The agglomerated dried product cake was passed through a Cumberland grinder to homogenize it and then bagged. Yield was approximately 99 kg., 95.3% of theoretical.

Characterization/Testing of Product

Final moisture levels on the dried product ranged from 0.2–0.5%, measured on a moisture balance set at 105 degrees Celsius. Thermo-gravimetric analysis (TGA) on the finished product indicated an ash level of 31.72%.

EXAMPLE III

A masterbatch of a silica-filled vinyl solution styrene butadiene rubber (SSBR MB), the product of Example I, was converted to a vulcanized rubber for use in tire treads. For comparison there was also tested a dry blend of the same rubber, mixed with silica particles that had not been hydrophobicized in accordance with the invention.

The masterbatch (228 parts), composed of 100 parts of rubber, 37.5 parts of aromatic oil extender, 80 parts of silica particles hydrophobicized in accordance with the invention by treatment with N-oleyl-N-(3-trimethoxysilyl)propyl ammonium chloride, with bis(triethoxysilylpropyl)sulfane (Si-69) (6.4 parts) and again with N-oleyl-N-(3-trimethoxysilyl)propyl ammonium chloride was placed in a Banbury mixer, BR-82 (Capacity 1.6 liters) under the following conditions:

Speed: 77 RPM
Start Temperature: 40° C.
Ram Pressure: 30 psi
Mokon: Set at 25° C.

To the masterbatch there were added stearic acid (1 part) and zinc oxide (2.5 parts) as activators, and these were mixed for 180 seconds. Any ingredients that had risen onto the surface and escaped from the mass in the mixer were swept back into the mass and mixing continued for a further 60 seconds, after which time the mixture was dumped from the Banbury mixer. To the mixture on a warm mill there were then added sulphur (1.4 parts), an accelerator Vulkacit CZ/EG-C(CBS) (1.7 parts) and a further accelerator Vulkacit D/C (DPG) 2 parts. These ingredients were refined on the mill (6 passes) to give a product whose specific gravity was 1.193. The total mixing time taken, from commencing mixing in the Banbury mixer to the completion of mill mixing, was 8 minutes.

For the dry mix, vinyl solution styrene butadiene rubber containing 100 parts polymer and 37.5 parts aromatic oil extender were placed in the Banbury mixer and mixed for 60 seconds. After 60 seconds, there were added untreated silica particles (Hi-Sil 233, 40 parts) and Si-69 coupling agent (3.2 parts) and mixing continued for a further 60 seconds. After 120 seconds, a further 40 parts of untreated silica particles and 3.2 parts of Si-69 were added and ingredients that had escaped from the mass were swept back into the mass, and mixing continued for a further 60 seconds. After 180 seconds, the ram of the mixer was raised, escaped ingredients were swept back into the mass, the ram lowered and mixing continued for a further 60 seconds. After 240 seconds, escaped ingredients were again swept back into the mass and stearic acid (1 part) and zinc oxide (2.5 parts) were added. Mixing was resumed, and after 300 seconds escaped ingredients were swept back into the mass, and mixing continued. After 420 seconds, the mass was dumped out of the mixer and formed into a sheet.

The mixer was allowed to cool to 40° C., then the mass was returned to the mixer and mixing continued until the temperature of the ram temperature probe reached 150° C. The mass was then dumped out. To the mixture on a warm mill there were then added sulphur (1.4 parts). Vulkacit CZ/EG-C (CBS) (1.7 parts) and Vulkacit D/C (DPG) (2 parts) and these ingredients refined on the mill (6 passes) to give a product whose specific gravity was 1.195. The total mixing time from commencement of mixing was 15.5 minutes.

The silica dry mix and the masterbatch of the invention were then subjected to tests whose results are given below:

VSBR Silica Dry Mix vs Masterbatch

|  | SILICA DRY MIX | SSBR MB |
|---|---|---|
| COMPOUND MOONEY VISCOSITY | | |
| ML 1 + 4' @ 100° C. (MU) | 61.9 | 78.6 |
| Mooney Relaxation: | | |
| Time to Decay 80% (min) | 0.16 | 0.25 |
| COMPOUND MOONEY SCORCH | | |
| Rotor Size: large | | |
| t5 @ 138° C. (min) | >30 | 7.8 |
| STRESS STRAIN (DUMBELLS) | | |
| Cure time (min) | 25 | 18 |
| Cure Temperature: 166° C. | | |
| Stress @ 25% elongation (MPa) | 1.1 | 0.95 |
| Stress @ 50% elongation (MPa) | 1.8 | 1.5 |
| Stress @ 100% elongation (MPa) | 3.8 | 3.1 |
| Stress @ 200% elongation (MPa) | 10.5 | 7.4 |
| Stress @ 300% elongation (MPa) | — | 14.4 |
| Tensile (MPa) | 13.8 | 14.4 |
| Elongation (%) | 240 | 300 |
| Hardness (Å) | 68 | 64 |
| Tensile × Elongation/100 | 33.1 | 43.2 |
| DIE C TEAR | | |
| Cure Time (min) | 25 | 18 |
| Cure Temperature 166° C. | | |
| Tear Strength (kN/m) | 26.9 | 42.6 |
| DIN Abrasion | | |
| Volume Loss (mm$^3$) | 123 | 105 |
|  | Compound #1 | Compound #2 |
|  | 1950S25 | XQ209 |
| ZWICK REBOUND | | |
| Cure Time (min) | 30 | 23 |
| Cure Temperature: 166° C. | | |
| Resilience @ 0° C. (%) | 4.6 | 5.0 |
| Resilience @ 23° C. (%) | 13.1 | 13.0 |
| Resilience @ 100° C. (%) | 61.0 | 64.6 |
| GOODRICH FLEXOMETER | | |
| Cure Time (min) | 30 | 23 |
| Cure Temperature: 166° C. | | |
| Ambient Temperature: 55° C. | | |
| Load on Beam: 11 kg | | |
| Stroke (Compression): 17.5% | | |
| Heat Rise (° C.) | 16.3 | 14.7 |
| Permanent Set (%) | 2.0 | 1.5 |
| MER 1100 Dynamic Properties | | |
| Frequency: 20 Hz @ 60° C. | | |
| Load: 7% static ± 3% dynamic | | |
| Static Stiffness (kg/mm) | 2.93 | 3.94 |
| Dynamic Stiffness (kg/mm) | 6.33 | 6.49 |
| Ratio-dynamic:static | 2.16 | 1.65 |
| Power Loss (g.m/sec) | 1.25 | 1.28 |
| Tan Delta | 0.149 | 0.148 |

These results suggest that, when used in tire treads, the product from the masterbatch will display lower rolling resistance, better abrasion resistance and equal traction characteristics, when compared with the silica dry mix.

EXAMPLE IV

A masterbatch of a high cis polybutadiene rubber, the product of Example II, was converted to a vulcanized rubber for use in tire treads. For comparison there was also tested a dry blend mix of the same rubber mixed with silica particles that had not been hydrophobicized in accordance with the invention.

The masterbatch (220.4 parts) composed of 100 parts of rubber, 30.0 parts aromatic extender oil, 80 parts of silica particles hydrophobicized in accordance with the invention by treatment with N-oleyl-N-(3-trimethoxysilyl)propyl ammonium chloride, with Si-69 (6.4 parts) and again with N-oleyl-N-(3-trimethoxysilyl)propyl ammonium chloride was placed in the same Banbury mixer as used in Example III, and mixed with stearic acid (1 part) and zinc oxide (2.5 parts) under the same conditions as in Example III. Thereafter, the mixture was dumped from the Banbury mixer and mixed with sulphur (1.4 parts), Vulkacit CZ/EG-C(CBS) (1.7 parts) and Vulkacit D/C (DPG) (2 parts) on a warm mill. The ingredients were refined (6 passes) to yield a product whose specific gravity was 1.193. The total mixing time was 8 minutes.

The dry mix of rubber (100 parts) untreated silica (80 parts) Si-69 (6.4 parts) stearic acid (1 part) aromatic extender oil (30 parts) and zinc oxide (2.5 parts) were mixed in the Banbury mixer under the same regime as described in Example III. Thereafter the mixture was admixed on a warm mill with sulphur (1.4 parts) Vulkacit CZ/EG-C(CBS) (1.7 parts) and Vulkacit D/C (DPG) (2 parts). The product had a specific gravity of 1.190. The total mixing time was 15.5 minutes.

The vulcanizates produced from the silica dry mix and the masterbatch of the invention were then subjected to tests whose results are given below:

BR Silica Masterbatchs

|  | TAKTENE 1203 + Silica | Silica mb |
|---|---|---|
| COMPOUND MOONEY VISCOSITY | | |
| ML 1 + 4' @ 100° C. (MU) | 64.9 | 71.3 |
| Mooney Relaxation: | | |
| Time to Decay 80% (min) | 0.20 | 0.23 |
| COMPOUND MOONEY SCORCH | | |
| Rotor Size: large | | |
| t5 @ 138° C. (min) | 22.75 | 5.86 |
| STRESS STRAIN (DUMBELLS) | | |
| Cure time (min) | 13 | 8 |
| Cure Temperature: 166° C. | | |
| Stress @ 25% elongation (MPa) | 1.2 | 0.97 |
| Stress @ 50% elongation (MPa) | 1.7 | 1.4 |
| Stress @ 100% elongation (MPa) | 2.7 | 2.1 |
| Stress @ 200% elongation (MPa) | 5.9 | 5.0 |
| Stress @ 300% elongation (MPa) | 10.6 | 9.4 |
| M300:M100 | 3.93 | 4.48 |
| Tensile (MPa) | 15.6 | 14.2 |
| Elongation (%) | 395 | 400 |
| Hardness (Å) | 67 | 72 |
| Tensile × Elongation/100 | 61.62 | 56.8 |
| DIE B TEAR | | |
| Cure Time (min) | 13 | 8 |
| Cure Temperature: 166° C. | | |
| Tear Strength (kN/m) | 63.0 | 75.1 |
| DIE C TEAR | | |
| Cure Time (min) | 13 | 8 |
| Cure Temperature: 166° C. | | |
| Tear Strength (kN/m) | 34.5 | 32.7 |
| DIN Abrasion | | |
| Volume Loss (mm$^3$) | 61 | 54 |

-continued

|  | Compound #3<br>TAKTENE<br>1203 + Silica | Compound #4<br>XQ 211 BR<br>Silica mb |
|---|---|---|
| ZWICK REBOUND |  |  |
| Cure Time (min) | 18 | 13 |
| Cure Temperature: 166° C. |  |  |
| Resilience @ 0° C. (%) | 53.0 | 53.0 |
| Resilience @ 23° C. (%) | 56.8 | 55.0 |
| Resilience @ 100° C. (%) | 61.4 | 65.0 |
| GOODRICH FLEXOMETER |  |  |
| Cure Time (min) | 18 | 13 |
| Cure Temperature: 166° C. |  |  |
| Ambient Temperature: 55° C. |  |  |
| Load on Beam: 11 kg |  |  |
| Stroke (Compression): 17.5% |  |  |
| Heat Rise (° C.) | 25.3 | 22.0 |
| Permanent Set (%) | 2.4 | 2.3 |
| MER 1100 Dynamic Properties |  |  |
| Frequency: 20 Hz @ 60° C. |  |  |
| Load: 7% static ± 3% dynamic |  |  |
| Static Stiffness (kg/mm) | 5.68 | 4.41 |
| Dynamic Stiffness (kg/mm) | 9.25 | 8.14 |
| Ratio-dynamic:static | 1.63 | 1.85 |
| Power Loss (g.m/sec) | 1.56 | 1.29 |
| Tan Delta | 0.129 | 0.126 |

Again, the results suggest that a tire tread vulcanizate produced from the masterbatch will display lower rolling resistance and better abrasion resistance, with equal traction characteristics, when compared with a tire tread vulcanizate produced from the dry mix.

What is claimed is:

1. A process for treating particles comprising the steps of:

contacting the particles with a compound of Formula I:

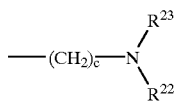

or an acid addition or quaternary ammonium salt thereof, in which:

$R^1$, $R^2$ and $R^3$ is selected from a hydroxyl group and a hydrolysable group;

$R^4$ is a divalent group that is resistant to hydrolysis at the Si—$R^4$ bond:

$R^5$ is selected from the group comprising: hydrogen; a $C_{1-40}$ alkyl; a $C_6$–$C_{40}$ aryl group; a $C_{2-40}$ mono-, di- or tri-unsaturated alkenyl group; a group of the formula:

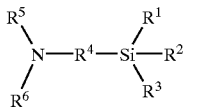

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

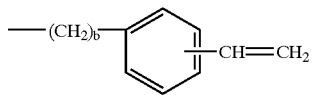

wherein b is an integer from 1 to 10; a group of formula:

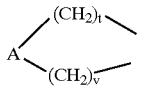

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

—$[(CH_2)_rNH]_d$—H wherein r is an integer from 1 to 6 and d is an integer from 1 to 4;

$R^6$ may be any of the groups defined for $R^5$, or $R^5$ and $R^6$ may together form a divalent group of formula:

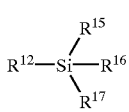

in which A is selected from the group comprising —CHR or —NR group in which R is hydrogen or a $C_{1-40}$ alkyl or $C_{2-40}$ alkenyl group, a $C_6$–$C_{40}$ aryl group, an oxygen atom and a sulfur atom, and t and v are each independently 1, 2, 3 or 4; provided that the sum of t and v does not exceed 6; and contacting the particles with a compound of the Formula II:

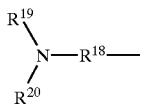

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

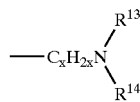

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

2. The process defined in claim 1, wherein Steps (a) and (b) are conducted concurrently.

3. The process defined in claim 1, wherein Steps (a) and (b) are conducted sequentially.

4. The process defined in claim 1, wherein Formulae I and II are different compounds.

5. The process defined in claim 1, wherein Step (a) comprises contacting an aqueous slurry of the particles with the compound of Formula I.

6. The process defined in claim 5, wherein the compound of Formula I is a solution comprising a solvent which is substantially water miscible.

7. The process defined in claim 1, wherein the particles are mineral particles that are hydrophilic and have surface hydroxyl groups.

8. The process defined in claim 1, wherein the particles are silica particles.

9. The process defined in claim 1, wherein:
$R^1$ is selected from the group consisting of hydroxyl groups, groups of formula $OC_pH_{2p+1}$, where p has a value from 1 to 10 and the alkyl chain may be interrupted by one or more oxygen atoms, phenoxy, acetoxy, chloro, bromo, iodo, ONa, OLi, OK, amino and mono- and dialkylamino,
$R^2$ is selected from the group consisting of hydroxy) groups, groups of formula $OC_pH_{2p+1}$ where p has a value from 1 to 10 and the alkyl chain may be interrupted by one or more oxygen atoms, phenoxy, acetoxy, ONa, OLi, OTC, amino mono- and dialkylamino, $C_{1-10}$, alkyl, $C_{2-10}$ mono- and di-unsaturated alkenyl, phenyl and groups of the formula:

—$R^4$—$NR^5$ $R^6$ wherein $R^4$, $R^5$, $R^6$ are as defined in claim 1.

10. The process defined in claim 1, wherein:
$R^{15}$ is selected from the group consisting of hydroxyl groups, groups of formula $OC_pH_{2p+1}$, where p has a value from 1 to 10 and the alkyl chain may be interrupted by one or more oxygen atoms, phenoxy, acetoxy, chloro, bromo, iodo, ONa, OLi, OK, amino and mono- and dialkylamino,
$R^{16}$ is selected from the group consisting of hydroxyl groups, groups of formula $OC_pH_{2p+1}$ where p has a value from 1 to 10 and the alkyl chain may be interrupted by one or more oxygen atoms, phenoxy, acetoxy, ONa, OLi, OK, amino, mono- and dialkylamino, $C_{1-10}$ alkyl, $C_{2-10}$ mono- and di-unsaturated alkenyl, phenyl and groups of formula:

—$R^{18}$—$NR^{19}R^{20}$— in which $R^{18}$ is a divalent group resistant to hydrolysis.

11. The process defined in claim 1, wherein the particulate material comprises mineral particles.

12. The process defined in claim 11, wherein the mineral particles are selected from the group consisting of silicates, silicas, clay, titanium dioxide, alumina, calcium carbonate, zinc oxide and mixtures thereof.

13. The process defined in claim 11, wherein the mineral particles comprise silica made by carbon dioxide precipitation of sodium silicate.

14. Particulate material which has been produced by the process defined in claim 1.

15. A particulate material comprising particles having bound thereto an aminohydrocarbonsilane moiety having the formula

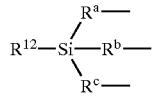

in which:
$R^a$, $R^b$ and $R^c$ are the same or different and each is selected from —O— and —$C_pH_{2p}$—, optionally substituted by one or more oxygen atoms and wherein p is an integer of from 1 to 10; and
$R^{12}$ is a $C_{8-40}$ alkyl group; a $C_{8-40}$ mono-, di- or tri-unsaturated alkenyl group; a group of formula

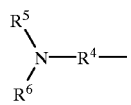

or an acid addition or quaternary ammonium salt thereof in which $R^4$ is a divalent group resistant to hydrolysis at the Si—$R^4$ bond, $R^5$ is hydrogen, $C_{1-40}$ alkyl, $C_{2-40}$ mono-, di- or tri- unsaturated alkenyl; a group of formula —$ArCH_wH_{2w+1}$ in which Ar represents a divalent aromatic group and w is an integer from 1 to 20, and $R^6$ may be any of the groups defined for $R^5$, with the proviso that at least one of $R^5$ and $R^6$ must have an uninterrupted carbon chain at least 8 carbon atoms in length.

16. A particulate material comprising particles having: (i) bound thereto an aminohydrocarbonsilane moiety, and (ii) a contact angle with water of at least about 100°.

17. The particulate material defined in claim 16, wherein the contact angle of at least about 110°.

18. The particulate material defined in claim 16, wherein the contact angle is in the range of from about 115° to about 160°.

19. The particulate material defined in claim 16, wherein the contact angle is in the range of from about 120° to about 150°.

20. The particulate material defined in claim 16, wherein the contact angle is in the range of from about 120° to about 140°.

21. The particulate material defined in claim 16, wherein the aminohydrocarbonsilane moeity has the formula

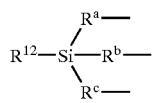

in which:
$R^a$, $R^b$ and $R^c$ are the same or different and each is selected from —O— and —$C_pH_{2p}$—, optionally substituted by one or more oxygen atoms and wherein p is an integer of from 1 to 10; and $R^{12}$ is a $C_{8-40}$ alkyl group; a $C_{8-40}$ mono-, di- or tri-unsaturated alkenyl group; a group of formula

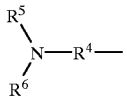

or an acid addition or quaternary ammonium salt thereof in which $R^4$ is a divalent group resistant to hydrolysis at the Si—$R^4$ bond, $R^5$ is hydrogen, $C_{1-40}$ alkyl, $C_{2-40}$ mono-, di- or tri-unsaturated alkenyl; a group of formula

in which Ar represents a divalent aromatic group and w is an integer from 1 to 20, and $R^6$ may be any of the groups defined for $R^5$, with the proviso that at least one of $R^5$ and $R^6$ must have an uninterrupted carbon chain at least 8 carbon atoms in length.

22. The particulate material defined in claim 15, wherein the particulate material comprises mineral particles.

23. The particulate material defined in claim 22, wherein the mineral particles are selected from the group consisting of silicates, silicas, clay, titanium dioxide, alumina, calcium carbonate, zinc oxide and mixtures thereof.

24. The particulate material defined in claim 22, wherein the mineral particles comprise silica made by carbon dioxide precipitation of sodium silicate.

25. The particulate material defined claim 15, wherein the particulate material comprises non-mineral particles.

26. The particulate material defined in claim 25, wherein the non-mineral particles comprise carbon black.

27. The process defined in claim 1, wherein two of $R^1$, $R^2$ and $R^3$ are selected from a hydroxyl group and a hydrolysable group.

28. The process defined in claim 1, wherein each of $R^1$, $R^2$ and $R^3$ are selected from a hydroxyl group and a hydrolysable group.

29. The process defined in claim 1, wherein the sum of t and v is 4.

30. The process defined in claim 1, wherein $R^{12}$ is selected from the group comprising a $C_{8-40}$ alkyl group or a $C_{8-40}$ mono-, di- or tri-unsaturated alkenyl group, either of which can be interrupted by one or more phenyl groups.

31. A process for treating particles to render them hydrophobic, the process comprising the following steps in sequence of:

(a) contacting the particles with a compound of Formula I:

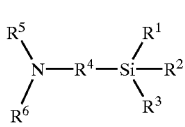

or an acid addition or quaternary ammonium salt thereof, in which:
at least one of $R^1$, $R^2$ and $R^3$ is selected from a hydroxyl group and a hydrolysable group;
$R^4$ is a divalent group that is resistant to hydrolysis at the Si—$R^4$ bond;
$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

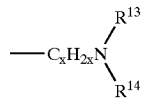

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

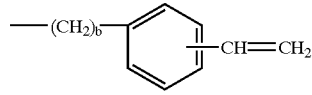

wherein b is an integer from 1 to 10; a group of formula:

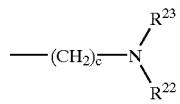

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

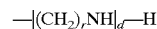

wherein r is an integer from 1 to 6 and d is an integer from 1 to 4;
$R^6$ may be any of the groups defined for $R^5$, or $R^5$ and $R^6$ may together form a divalent group of formula:

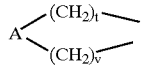

in which A is selected from the group comprising —CHR or —NR group in which R is hydrogen or a $C_{1-40}$ alkyl or $C_{2-40}$ alkenyl group, a $C_5$–$C_{40}$ aryl group, an oxygen atom and a sulfur atom, and t and v are each independently 1, 2, 3 or 4; provided that the sum of t and v does not exceed 6; and (b) contacting the particles with a compound of the Formula II:

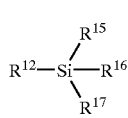

in which:
$R^{15}$, $R^{16}$ and $R^{17}$ have the same definitions as $R^1$, $R^2$ and $R^3$; and
$R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

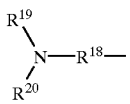

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

32. A process for treating particles to render them hydrophobic, the process comprising the steps of:
(a) contacting the particles with a compound of Formula 1:

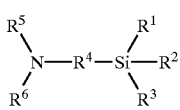

(I)

or an acid addition or quaternary ammonium salt thereof, in which:
at least one of $R^1$, $R^2$ and $R^3$ is selected from a hydroxyl group and a hydrolysable group;
$R^4$ is a divalent group that is resistant to hydrolysis at the Si—$R^4$ bond;
$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

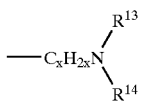

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

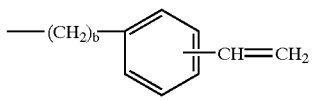

wherein b is an integer from 1 to 10; a group of formula:

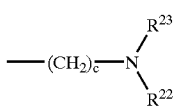

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

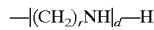

wherein r is an integer from 1 to 6 and d is an integer from 1 to 4;
$R^6$ may be any of the groups defined for $R^5$, or $R^5$ and $R^6$ may together form a divalent group of formula:

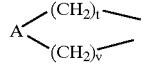

in which A is selected from the group comprising —CHR or —NR group in which R is hydrogen or a $C_{1-40}$ alkyl or $C_{2-40}$ alkenyl group, a $C_5$–$C_{40}$ aryl group, an oxygen atom and a sulfur atom, and t and V are each independently 1, 2, 3 or 4; provided that the sum of t and v does not exceed 6; and
(b) contacting the particles with a compound of the Formula II;

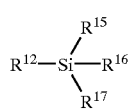

(II)

in which:
$R^{15}$, $R^{16}$ and $R^{17}$ have the same definitions as $R^1$, $R^2$ and $R^3$; and
$R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

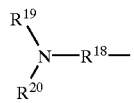

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms; wherein Formulae I and II are the same compound.

33. A process for treating particles to render them hydrophobic, the process comprising the steps of:
(a) contacting the particles with a compound of Formula I:

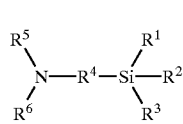

(I)

or an acid addition or quaternary ammonium salt thereof, in which:
at least one of $R^1$, $R^2$ and $R^3$ is selected from a hydroxyl group and a hydrolysable group;

$R^4$ is a divalent group that is resistant to hydrolysis at the Si—$R^4$ bond;

$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

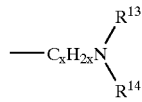

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

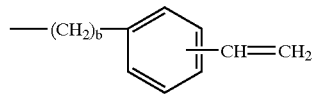

wherein b is an integer from 1 to 10; a group of formula:

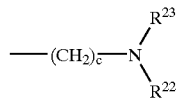

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

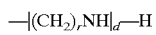

wherein r is an integer from 1 to 6 and d is an integer from 1 to 4;

$R^6$ may be any of the groups defined for $R^5$, or $R^5$ and $R^6$ may together form a divalent group of formula:

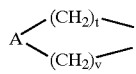

in which A is selected from the group comprising —CHR or —NR group in which R is hydrogen or a $C_{1-40}$ alkyl or $C_{2-40}$ alkenyl group, a $C_5$–$C_{40}$ aryl group, an oxygen atom and a sulfur atom, and t and v are each independently 1, 2, 3 or 4; provided that the sum of t and v does not exceed 6; and (b) contacting the particles with a compound of the Formula II:

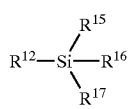

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

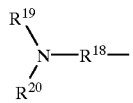

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms; wherein the particles are contacted with a coupling agent after the addition of the compound of Formula I but before the addition of the compound of Formula II.

34. The process according to claim 33, wherein the coupling agent is selected from the group consisting of bis[3-(triethoxysilyl)propyl]tetrasulfane, bis[3-(triethoxysilyl)propyl]tetrasulfane, bis[2-(trimethoxysilyl)ethyl]tetrasulfane and mixtures thereof.

35. A process for treating particles to render them hydrophobic, the process comprising the steps of:

(a) contacting the particles with an acid addition or quaternary ammonium salt of a compound of Formula I:

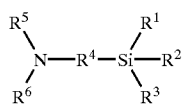

in which:

at least one of $R^1$, $R^2$ and $R^3$ is selected from a hydroxyl group and a hydrolysable group;

$R^4$ is a divalent group that is resistant to hydrolysis at the Si—$R^4$ bond;

$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

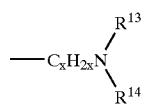

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

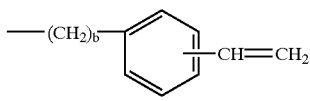

wherein b is an integer from 1 to 10; a group of formula:

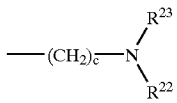

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

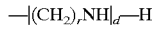

wherein r is an integer from 1 to 6 and d is an integer from 1 to 4;

$R^6$ may be any of the groups defined for $R^5$, or $R^5$ and $R^6$ may together form a divalent group of formula:

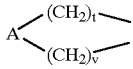

in which A is selected from the group comprising —CHR or —NR group in which R is hydrogen or a $C_{1-40}$ alkyl or $C_{2-40}$, alkenyl group, a $C_5$–$C_{40}$ aryl group, an oxygen atom and a sulfur atom, and t and v are each independently 1, 2, 3 or 4; provided that the sum of t and v does not exceed 6; and (b) contacting the particles with a compound of the Formula II:

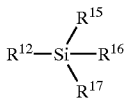

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

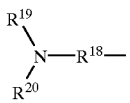

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group;

and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

36. A process according to claim 35, wherein compound of Formula I is N-oleyl-N-(3-trimethoxysilyl)propyl ammonium dichloride or an acid addition or quaternary ammonium salt thereof.

37. A process for treating particles to render them hydrophobic, the process comprising the steps of:

(a) contacting the particles with a compound of Formula I:

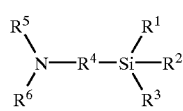

or an acid addition or quaternary ammonium salt thereof, in which:

at least one of $R^1$, $R^2$ and $R^3$ is selected from a hydroxyl group and a hydrolysable group;

$R^4$ is a divalent group that is resistant to hydrolysis at the Si—$R^4$ bond;

$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

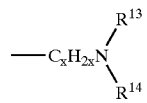

in which x is an integer from 2 to 10, $R^{13}$ and $R^{14}$, which may be the same or different, are each hydrogen; $C_{1-18}$ alkyl; $C_{2-18}$ a mono-, di- or tri-unsaturated alkenyl; phenyl; a group of formula:

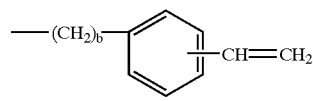

wherein b is an integer from 1 to 10; a group of formula:

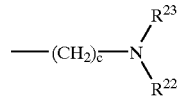

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

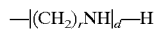

wherein r is an integer from 1 to 6 and d is an integer from 1 to 4;

$R^6$ may be any of the groups defined for $R^5$, or $R^5$ and $R^6$ may together form a divalent group of formula:

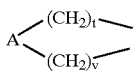

in which A is selected from the group comprising —CHR or —NR group in which R is hydrogen or a $C_{1-40}$ alkyl or $C_{2-40}$ alkenyl group, a $C_5$–$C_{40}$ aryl group, an oxygen atom and a sulfur atom, and t and v are each independently 1, 2, 3 or 4; provided that the sum of t and v does not exceed 6; and (b) contacting the particles with a compound of the Formula II:

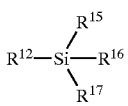 (II)

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

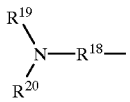

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms; wherein the compound of Formula II is N-oleyl-N-(3-trimethoxysilyl)propyl ammonium dichloride or an acid addition or quaternary ammonium salt thereof.

38. A process for treating particles to render them hydrophobic, the process comprising the steps of:

(a) contacting the particles with a compound of Formula I:

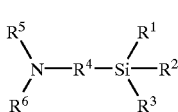 (I)

or an acid addition or quaternary ammonium salt thereof, in which:

at least one of $R^1$, $R^2$ and $R^3$ is selected from a hydroxyl group and a hydrolysable group;

$R^4$ is a divalent group that is resistant to hydrolysis at the Si—$R^4$ bond;

$R^5$ is selected from the group comprising: hydrogen; a $C_{1-40}$ alkyl; a $C_5$–$C_{40}$ aryl group; a $C_{2-40}$ mono-, di- or tri-unsaturated alkenyl group; a group of the formula:

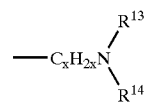

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

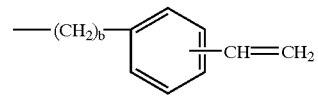

wherein b is an integer from 1 to 10; a group of formula:

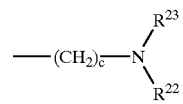

wherein c is an integer from 1 to 10 and $R^{22}$ and $R^{23}$, which may be the same or different, are each hydrogen, $C_{1-10}$ alkyl group or $C_{2-10}$ alkenyl group, provided that there is no double bond in the position alpha to the nitrogen atom; a group of formula:

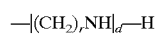

wherein r is an integer from 1 to 6 and d is an integer from 1 to 4;

$R^6$ may be any of the groups defined for $R^5$, or $R^5$ and $R^6$ may together form a divalent group of formula:

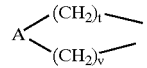

in which A is selected from the group comprising —CHR or —NR group in which R is hydrogen or a $C_{1-40}$ alkyl or $C_{2-40}$ alkenyl group, a $C_5$–$C_{40}$ aryl group, an oxygen atom and a sulfur atom, and t and v are each independently 1, 2, 3 or 4; provided that the sum of t and v does not exceed 6; and (b) contacting the particles with a compound of the Formula II:

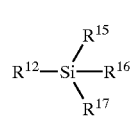 (II)

in which:

$R^{15}$, $R^{16}$ and $R^{17}$ have the same definitions as $R^1$, $R^2$ and $R^3$; and $R^{12}$ is selected from the group comprising a $C_{8-40}$ alkyl group or a $C_{8-40}$ mono-, di- or tri-unsaturated alkenyl group, either of which can be interrupted by one or more aryl groups; a group of formula:

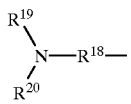

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, the aromatic group being unsubstituted or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms, wherein the particulate material comprises non-mineral particles.

39. A process according to claim 38, wherein said non-mineral particles comprise carbon black.

* * * * *